United States Patent
Mashinsky

(10) Patent No.: US 6,343,073 B1
(45) Date of Patent: *Jan. 29, 2002

(54) METHOD AND SYSTEM FOR EFFICIENT LINK UTLIZATION

(75) Inventor: Alexander Mashinsky, New York, NY (US)

(73) Assignee: Anip, Inc., Carson City, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,144

(22) Filed: Dec. 31, 1997

(51) Int. Cl.[7] .............................................. H04L 12/28
(52) U.S. Cl. ........................ 370/352; 370/401; 379/220
(58) Field of Search ................................. 370/351, 352, 370/353, 354, 355, 356, 252, 400, 401, 477, 521, 524; 379/111, 112, 115, 219, 220, 221, 202, 203, 204, 243, 272, 273

(56) References Cited

U.S. PATENT DOCUMENTS

| 4,068,101 A | 1/1978 | Chemarin | 179/18 BG |
| 4,166,929 A | 9/1979 | Sheinbein | 179/18 BG |

(List continued on next page.)

FOREIGN PATENT DOCUMENTS

| EP | 0501903 A1 | 9/1992 |
| EP | 0658061 A2 | 6/1995 |
| GB | 2316266 A | 2/1998 |
| WO | WO 92/01350 | 1/1992 |
| WO | WO 93/16543 | 8/1993 |
| WO | WO 93/16544 | 8/1993 |
| WO | WO 93/16546 | 8/1993 |
| WO | WO 94/28683 | 12/1994 |
| WO | 97/16916 | * 5/1997 |

OTHER PUBLICATIONS

Tao et al., "Internet Access via Baseband and Broadband ISDN Gateways", Dec. 4, 1994, (IEEE).

"Survey: Telecoms", in *The Economist*, vol. 344, No. 8034 (Sep. 13, 1997), pp 56/1–56/34.

(List continued on next page.)

*Primary Examiner*—Wellington Chin
*Assistant Examiner*—Frank Duong
(74) *Attorney, Agent, or Firm*—Chi K. Eng

(57) ABSTRACT

A method and system for dynamic utilization of the available bandwidth on existing ISDN and other broadband links is disclosed. In a first preferred embodiment, an efficient link-utilization system comprises first and second telecommunication nodes connected by one or more ISDN links or other broadband connections. When a caller desires to place a call from a communication device served by the first telecommunication node to a communication device served by the second telecommunication node, the first telecommunication node determines whether an existing broadband link connecting the first and second telecommunication nodes has sufficient available bandwidth to carry the call in compressed form from the calling communication device to the called communication device. If such an existing telephonic link is identified, the first telecommunications node compresses the transmission received from the caller and transmits the compressed transmission to the second telecommunications node via the available bandwidth on the existing telephonic link. The second telecommunications node decompresses the transmission and transmits the decompressed transmission to the called party. The disclosed efficient link utilization system may be employed by node operators to provide distinct classes of service to their customers, including guaranteed connection service and non-guaranteed connection service. In additional preferred embodiments, the principles of the invention are extended to multiple node arrangements.

21 Claims, 19 Drawing Sheets

U.S. PATENT DOCUMENTS

| | | | |
|---|---|---|---|
| 4,313,035 A | | 1/1982 | Jordan et al. ............ 179/18 BE |
| 4,313,036 A | | 1/1982 | Jabara et al. ........... 179/18 AD |
| 4,594,477 A | | 6/1986 | Noirot .................... 179/18 AD |
| 4,866,703 A | * | 9/1989 | Black et al. ................ 370/352 |
| 5,012,515 A | | 4/1991 | McVitie ....................... 380/49 |
| 5,027,387 A | | 6/1991 | Moll .......................... 379/112 |
| 5,065,393 A | | 11/1991 | Sibbit et al. |
| 5,163,042 A | | 11/1992 | Ochiai ......................... 370/17 |
| 5,247,676 A | | 9/1993 | Ozur et al. ................. 395/650 |
| 5,311,583 A | | 5/1994 | Friedes et al. .............. 379/209 |
| 5,313,467 A | * | 5/1994 | Varghese et al. ............ 370/400 |
| 5,353,331 A | | 10/1994 | Emery et al. ................. 379/58 |
| 5,408,518 A | | 4/1995 | Yunoki ......................... 379/67 |
| 5,408,526 A | | 4/1995 | McFarland et al. ......... 379/202 |
| 5,414,752 A | | 5/1995 | Jonsson ....................... 379/58 |
| 5,425,084 A | | 6/1995 | Brinskele .................... 379/112 |
| 5,425,091 A | | 6/1995 | Josephs ....................... 379/201 |
| 5,438,616 A | | 8/1995 | Peoples ....................... 379/201 |
| 5,479,495 A | | 12/1995 | Blumhardt .................. 379/207 |
| 5,506,887 A | | 4/1996 | Emery et al. ................. 379/58 |
| 5,515,425 A | | 5/1996 | Penzias et al. .............. 379/114 |
| 5,526,413 A | | 6/1996 | Cheston, III et al. ....... 379/201 |
| 5,533,100 A | | 7/1996 | Bass et al. |
| 5,606,602 A | | 2/1997 | Johnson et al. ............. 379/115 |
| 5,608,782 A | | 3/1997 | Carlsen et al. ................ 379/63 |
| 5,608,786 A | * | 3/1997 | Gordon ...................... 379/100 |
| 5,638,363 A | * | 6/1997 | Gittins et al. ............... 370/358 |
| 5,661,790 A | | 8/1997 | Hsu |
| 5,675,636 A | | 10/1997 | Gray .......................... 379/114 |
| 5,706,507 A | | 1/1998 | Schloss ...................... 395/615 |
| 5,764,741 A | | 6/1998 | Barak ......................... 379/114 |
| 5,771,279 A | | 6/1998 | Cheston, III et al. .... 379/93.17 |
| 5,790,642 A | | 8/1998 | Taylor et al. ............... 379/112 |
| 5,825,858 A | | 10/1998 | Shaffer et al. .............. 379/120 |
| 5,917,897 A | | 6/1999 | Johnson et al. |
| 5,940,479 A | * | 8/1999 | Guy et al. ................... 370/410 |
| 5,970,126 A | * | 10/1999 | Bowater et al. ............ 370/352 |
| 5,999,598 A | | 12/1999 | Henrick et al. |
| 6,047,006 A | * | 4/2000 | Brakefield et al. .......... 370/524 |
| 6,069,890 A | * | 5/2000 | White et al. ................ 370/352 |

OTHER PUBLICATIONS

"Auctioning Telephone Calls", in *The Economist*, vol. 344, No. 8032 (Aug. 30, 1997), pp 47–48.

Book Review, Impact Of Liberalization On Resale And Callback, Telecommunications Policy, vol. 21, No. 3, pp. 275–276 (1997).

Brennan, Industry Parallel Interconnection Agreements, Information Economics and Policy vol. 9, No. 2, pp. 133–149 (1997).

R. Frieden, "Chapter 9: The International Telecommunications Toll Revenue Division Process", in *International Telecommunications Handbook* (1996), pp 133–148, Artech House.

Y. Levy, S. Durinovic–Johri, and R.A. Milito, "Dynamic Network Call Distribution with Periodic Updates", in *Teletrafic Science and Engineering*, vol. 1a (J. Labetoulle, and J.W. Roberts, ed.) (1994), Elsevier.

Raif O. Onvural, *Asynchronous Transfer Mode Networks: Performance Issues* (1994), Section 6.3–6.4, Artech House.

B. Yuhas & N Ansari ed., *Nueral Networks in Telecommunications* (1994), Chapter 1, Kluwer.

Globerman et al., Competition In Public Long–distance Telephone Markets In Canada, Telecommunications Policy, vol. 17, No. 4, pp. 297–312 (1993).

R. Frieden, "International Toll Revenue Division: Tackling the Inequities and Inefficiencies", in *Telecommunications Policy*, vol. 17, No. 3 (Apr. 1993), pp 221–133, Butterworth– Heinemann.

R.J. Horrocks & R.W.A. Scarr, "Chapter 24: Tariff Principles", in *Future Trends in Telecommunications*, 1993, pp 387–392, J. Whitaker & Sons.

K. Cheong & M. Mullins, "International Telephone Service Imbalances: Accounting Rates and Regulatory Policy", Telecommunications Policy, vol. 15, No. 2 (Apr. 1991), pp 107–118.

R.M.Frieden, "Accounting Rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow Control in High–Speed Wide–Area Networks", in *Proceedings of the IEEE*, vol. 78, No. 1 (Jan. 1990), pp 204–221, IEEE.

B. Warfield & P. Sember, "Prospects for the Use of Artificial Intelligence in Real–Time Network Traffic Management", in *Computer Networks and ISDN Systems*, vol. 20 (1990), pp 163–169, Elsevier Science.

A. Girard, *Routing and Dimensioning in Circuit–Switched Networks*, (1990), Addison–Wesly, (Table of Contents only).

J. Potvin, & S.F. Smith, "Flexible Systems for the Design of Heuristic Algorithms in Complex or Domains", in Impact of Recent Computer Advances on Operations Research (1989), pp 332–344, Elsevier Science.

G.L. Schultz & R.R. Meyer, "A Flexible Parallel Algorithm for Block–Constrained Optimization Problems", in *Impact of Recent Computer Advances on Operations Research* (1989), pp 82–91.

M. Schwartz, *Telecommunication Networks* (1987), Sec.6–2, Addison–Wesley.

* cited by examiner

Call Database (Node 115)

| Call No. | Calling Device | Called Device | Via Node | BW Required | Guaranteed | Share-Link? |
|---|---|---|---|---|---|---|
| 1696 | 212-554-1234 | 44-71-556-4321 | 156 | 8 Kb/s | yes | yes |
| 1937 | 212-664-2345 | 972-2-887-9887 | 434 | 8 Kb/s | yes | no |
| 2148 | 44-81-776-5432 | 212-774-3456 | 156 | 16 Kb/s | yes | yes |
| 3033 | 212-884-4567 | 44-71-886-6543 | 156 | 8 Kb/s | no | yes |
| 4280 | 310-533-1357 | 212-994-5678 | 263 | 8 Kb/s | yes | yes |
| 4775 | 212-224-7890 | 11-81-336-9876 | 120 | 8 Kb/s | yes | yes |
| 4896 | 11-81-446-0987 | 212-334-8901 | 120 | 56 Kb/s | no | yes |
| 4940 | 212-554-9012 | 310-633-3579 | 263 | 8 Kb/s | yes | yes |
| 5232 | 212-664-0123 | 310-733-5791 | 263 | 8 Kb/s | yes | no |
| 6243 | 44-81-996-7654 | 212-774-1234 | 156 | 16 Kb/s | yes | yes |
| 7893 | 212-884-2345 | 44-71-226-8765 | 156 | 16 Kb/s | no | yes |

FIG. 2A

ISDN Link Database (Node 115)

| Link No. | Connected-To-Node | Bandwidth Utilization | | | | Available BW |
|---|---|---|---|---|---|---|
| 1 | 120 | Call no. 4896 | | | Call no. 4775 | 0 |
| 2 | 156 | Call no. 6243 | Call no. 7893 | Call no. 2148 | Call no. 3033 | Call no. 1696 | 0 |
| 3 | 263 | Call no. 4280 | Call no. 4940 | Call no. 5232 | | | 24 |
| 4 | 434 | Call no. 1937 | | | | 56 |
| 5 | Not Active | | | | | |

| Link No. | Connected-To-Node | BW Utilization | | | | Available BW |
|---|---|---|---|---|---|---|
| 4 | 120 | Call no. 4684 | Call no. 4893 | Call no. 5327 | Call no. 1254 | 24 |

FIG. 9B

| Link No. | Connected-To-Node | BW Utilization | | | | | Available BW |
|---|---|---|---|---|---|---|---|
| 4 | 120 | Call no. 4684 | Call no. 4893 | Call no. 5327 | Call no. 1254 | Call no. 5512 | 16 |

| Link No. | Connected-To-Node | BW Utilization | | | Available BW |
|---|---|---|---|---|---|
| | | | | | |

FIG.11A: Link No. 4, Connected-To-Node 120, Call no. 4692, Call no. 4830, Call no. 4321, Available BW 40

FIG.11B: Link No. 2, Connected-To-Node 115, Call no. 4692, Call no. 4830, Call no. 4321, Available BW 40

FIG.11C: Link No. 4, Connected-To-Node 120, Call no. 4692, Call no. 4321, Available BW 48

FIG.11D: Link No. 2, Connected-To-Node 115, Call no. 4692, Call no. 4321, Available BW 48

FIG.11E: Link No. 4, Not active

FIG.11F: Link No. 2, Not active

METHOD AND SYSTEM FOR EFFICIENT LINK UTLIZATION

BACKGROUND OF THE INVENTION

In recent years, the integrated services digital network (ISDN) has become an important part of the telecommunications landscape. Many factors have led to this growing role for ISDN. First, the growing trend toward implementation of primarily digital capabilities for telephone networks has made it feasible to offer a wide variety of broadband digital services to end users, which in the past would have been beyond the capability of such networks to provide.

In addition, as the capability to provide digital services has grown, the demand for these services has also flourished. The telecommunications industry has seen a growing demand for domestic and international digital communications service for both voice and data. Businesses which rely on the telecommunications community to provide the data and voice connectivity necessary to conduct remote business operations significantly contribute to this demand.

The ISDN network "provides end-to-end digital connectivity to support a wide range of services, including voice and non-voice services." See ITU Recommendation I.110, from the International Telecommunication Union Telecommunication Standardization Sector, which is hereby incorporated by reference.

Because ISDN provides voice and non-voice (e.g., data) services, ISDN supports both circuit and packet-mode switching. As is known in the art, circuit switching is generally more suitable for voice calls, while packet-mode switching is generally more suitable for transmission of data.

One significant advantage of an ISDN link over ordinary communication device connections is its large bandwidth. As known in the art, an ISDN basic rate interface generally comprises at least three channels, a D channel and two B channels (2B+D). The primary function of the D channel is to carry network signalling information such as service-requests and other messages. The bandwidth of the D channel, is either 16 Kb/s or 64 Kb/s, depending on the user's access interface. In either event, this bandwidth is usually significantly greater than that necessary to carry the network's signalling traffic. Consequently, excess bandwidth on the D channel may be used to transmit packet data.

The B channel is the basic user-services channel in ISDN. It has a bandwidth of 64 Kb/s and may carry any type of user data including voice, audio, video, and other digital data. See Kessler & Southwick, ISDN: Concepts, Facilities, and Services (3rd ed. McGraw-Hill 1997), which is hereby incorporated by reference. Thus, each B channel on an ISDN link connecting a calling location to a network central office (CO) guarantees the caller a bandwidth of 64 Kb/s through the network to any destination similarly equipped with an ISDN interface.

In contrast, when voice calls or other transmissions (such as fax transmissions) are routed via a Plain Old Telephone Service (POTS) connection, the telephone company does not guarantee that the bandwidth allocated to the call will be greater than 8 Kb/s at its narrowest point. Typically, the connection between the calling telephone and the network central office (CO) is established via an end loop having a bandwidth of at least 64 Kb/s. At the CO, however, compression techniques are employed to compress the transmission to a bandwidth of 8 Kb/s. The transmission is sent in compressed form to a called-location CO located near the called telephone. The called location CO decompresses the transmission and transmits it to the called telephone via an end loop connecting the called location CO and the called telephone.

Thus, the bandwidth allocated by the network to an ISDN B channel is eight times greater than that allocated to a POTS connection. The price of a B channel, however, is significantly less than eight times the price of a POTS connection. ISDN connect time is thus significantly underpriced when compared with POTS connections.

In addition, the substantial bandwidth allocated to each ISDN link frequently leads to the inefficient utilization of such links. For example, a user may establish an ISDN link comprising a 64 Kb/s B channel between a calling telephone and a called telephone, and use the link simply to carry a single voice communication with a bandwidth requirement of only 8 Kb/s. Thus, it is an inefficient use of the ISDN link to carry a single voice call.

SUMMARY OF THE INVENTION

The preferred embodiment provides dynamic utilization of the available bandwidth on existing ISDN links connecting users in a telecommunications network. The system thus improves the efficiency of ISDN link utilization by increasing the portion of the link bandwidth that can be usefully employed. In addition to ISDN, the invention is generally applicable to connections having a bandwidth that is higher than the bandwidth that is required to carry communications typically transmitted over such connections.

In a first preferred embodiment of the invention, an efficient link-utilization system comprises first and second telecommunication nodes connected by one or more ISDN links or other broadband connections. When a caller desires to place a call from a communication device served by the first telecommunication node to a communication device served by the second telecommunication node, the first telecommunication node determines whether an existing broadband link connecting the first and second telecommunication nodes has sufficient available bandwidth to carry the call in compressed form from the calling communication device to the called communication device. If such an existing telephonic link is identified, the first telecommunications node compresses the transmission received from the caller and transmits the compressed transmission to the second telecommunications node via the available bandwidth on the existing telephonic link. The second telecommunications node decompresses the transmission and transmits the decompressed transmission to the called party.

The disclosed efficient link utilization system may be employed by node operators to provide distinct classes of service to their customers, including guaranteed connection service and non-guaranteed connection service.

In additional preferred embodiments, the principles of the invention are extended to multiple node arrangements.

More specifically, the present invention provides a method of connecting a call from a caller to a called party via a call routing path comprising two or more telecommunications nodes, comprising:

identifying an existing broadband link with available bandwidth connecting first and second telecommunication nodes in the call routing path; and utilizing at least a portion of the available bandwidth to connect the caller to the called party.

The preferred embodiments are described primarily in terms of a calling communication device (e.g., a calling telephone) and a called communication device (e.g., a called telephone), which are connected in a telephone network environment. It will be understood by those skilled in the art, however, that the present invention may be practiced in all manner of communications environments including, by way of example but not limitation, voice transmission environments and data transmission environments.

In addition, those skilled in the art will recognize that the invention may be practiced using all manner of communication devices including, by way of example but not limitation, telephones, answering machines, fax machines, local switches (such as in hotels or offices), voice synthesis/ recognition equipment, dialers, answering services, and computers.

Also, although the preferred embodiments are described primarily in connection with ISDN, the principles of the present invention may be equally applied to other broadband transmission environments such as ATM.

BRIEF DESCRIPTION OF THE DRAWINGS

The above objects and summary of the invention will be better understood when taken in conjunction with the following detailed description and accompanying drawings in which:

FIG. 2A is a schematic representation of a call database;

FIG. 2B is a schematic representation of a link utilization database;

FIGS. 9A–B are schematic representations of particular link records;

FIGS. 11A–F are schematic representations of particular link records;

DETAILED DESCRIPTION OF PREFERRED EMBODIMENTS

Figure 1A:
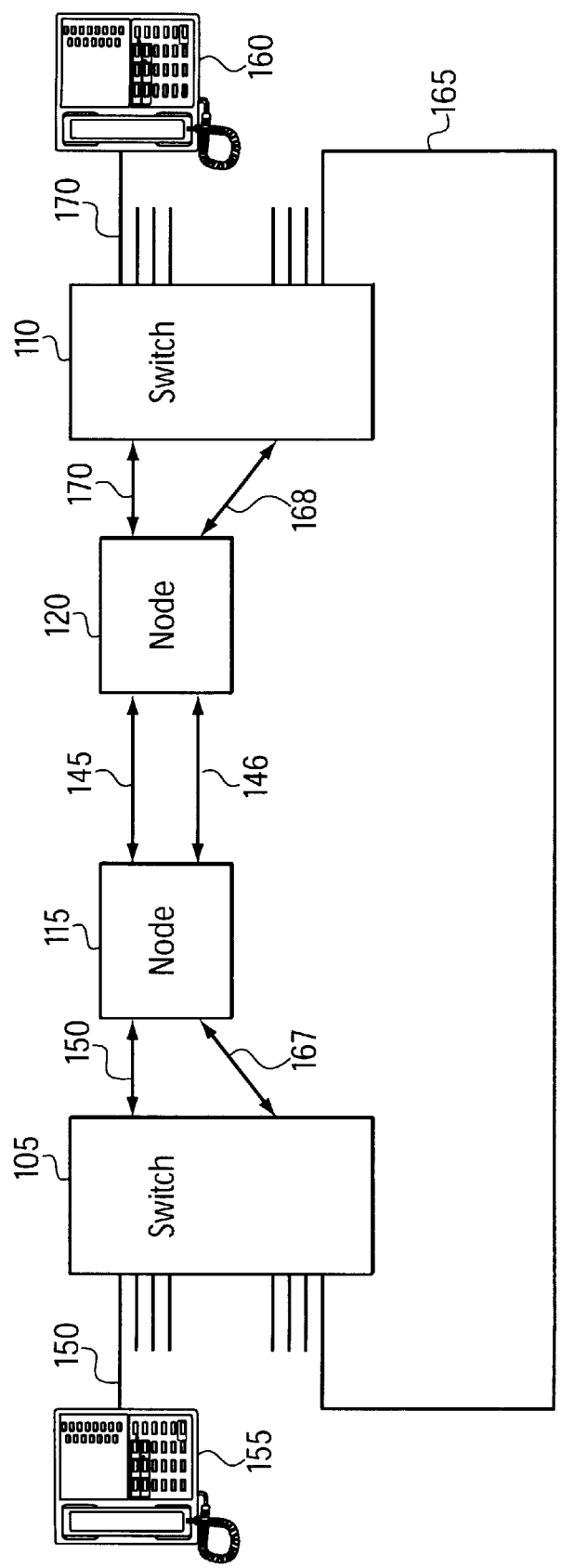
FIG. 1A is a block diagram of a communications system architecture suitable for implementing the efficient link utilization system of the present invention.

FIG. 1A shows a communications system architecture suitable for implementing the efficient link-utilization system of the present invention. As shown in FIG. 1A, this architecture preferably comprises a first telephone switch 105 located in a first location and a second telephone switch 110 located in a location remote from the first location. Both switches contain at least one trunk that supports ISDN capabilities. Typically, switches 105 and 110 constitute part of the telephone networks owned and maintained by the local telephone authorities in the first and remote locations, respectively. Communication devices (e.g., telephones) 155, 160 are connected to switches 105, 110 by conventional wired or wireless lines schematically represented by lines 150 and 170, respectively. Switches 105 and 110 are connected by conventional wired or wireless networks, such as the public switched telephone network, schematically represented by line 165.

Also shown in FIG. 1A are an originating telecommunication node 115 adapted to place and receive calls through switch 105 and a terminating telecommunication node 120 adapted to place and receive calls through switch 110. In a preferred embodiment, telecommunication nodes 115 and 120 are computer-based local telecommunication nodes capable of establishing a connection between two parties each of whom is connected to a respective node via a telephone line or other suitable line.

In a preferred embodiment, telecommunication node 115 is connected to switch 105 by telephone lines including one or more ISDN lines (or other suitable lines, e.g., T1 lines) shown schematically as line 167. Similarly, telecommunication node 120 is connected to switch 110 by telephone lines including one or more ISDN or other suitable lines shown schematically as line 168. Each of the ISDN lines typically comprise a signalling or D channel with a bandwidth of 64 Kb/s, and two user-services or B channels of 64 Kb/s, as is known in the art. This configuration is known as BRI. Alternatively, the user-services channel of the ISDN line may comprise an H channel. As known in the art, H channels are user-services channels with a bandwidth equal to an integer multiple of 64 Kb/s. For example, an $H_0$ channel has a bandwidth of 384 Kb/s, the same bandwidth as six B channels. Alternatively, the ISDN line may comprise 23 B channels and one D channel. This configuration is known as PRI.

As is further shown in FIG. 1A, originating node 115 and terminating node 120 are connected by a data link such as data line 145. Alternatively, the data connection between originating node 115 and terminating node 120 may be achieved by another suitable data or voice link employing wired or wireless technologies. For example, the data connection between originating node 115 and terminating node 120 may be achieved by a dial up link or via the SS7 or C7 networks, or by utilizing the user-to-user interface feature available in ISDN or another available data transmission feature. These alternative data connections are schematically represented by line 146 in FIG. 1A. Thus as described in more detail below, data transmissions between nodes may be carried via the D channel of an ISDN link. As described below, the demands placed on the data line by the system of the present invention are small, permitting the data transmission needs of the present invention to be satisfied by a wide variety of communications options.

Figure 1B:
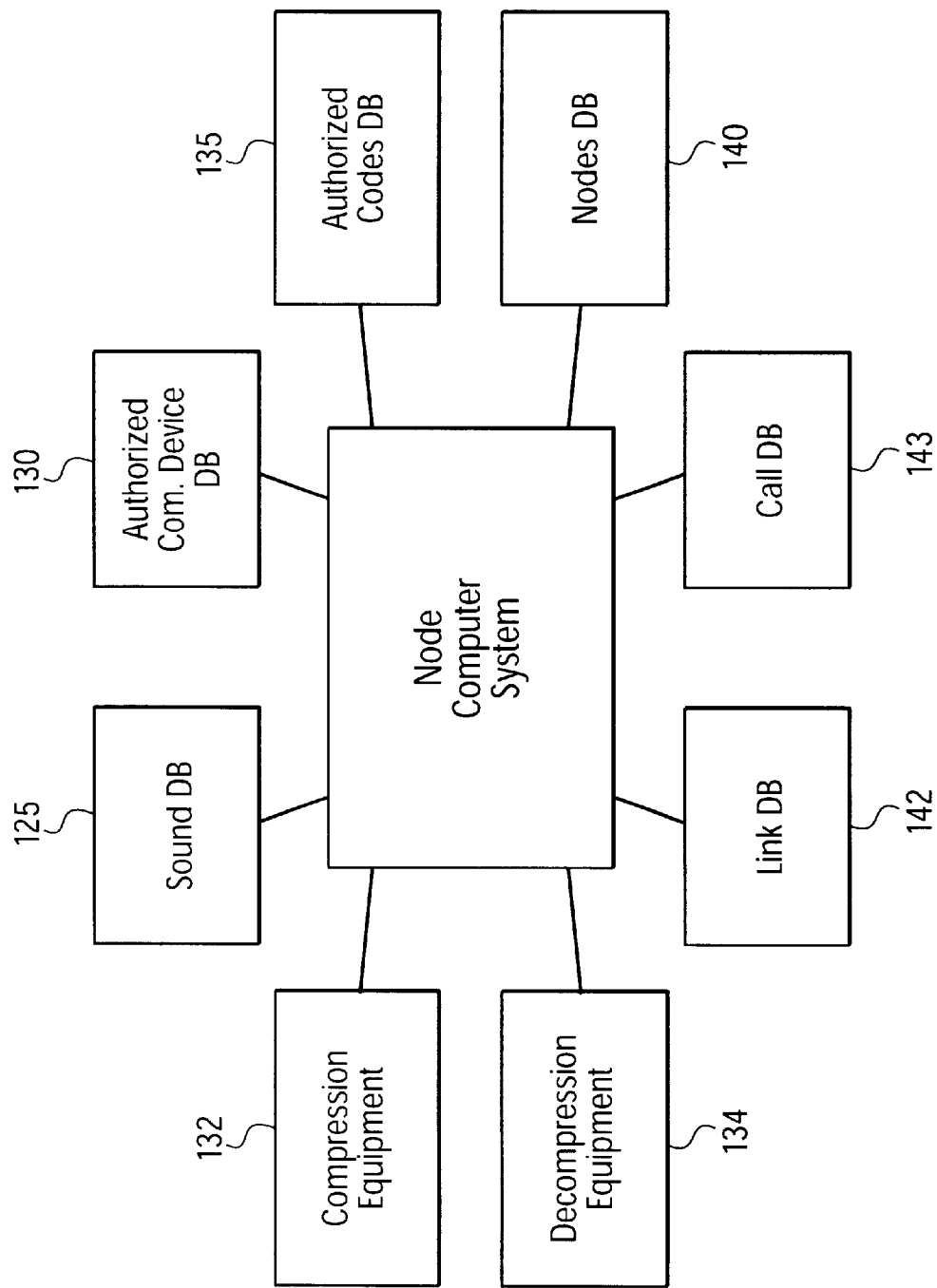
FIG. 1B is a block diagram of a telecommunications node suitable for use in the communications system of FIG. 1A.

A preferred embodiment for telecommunication nodes 115 and 120 is shown in FIG. 1B. As shown in FIG. 1B, each telecommunication node 115, 120 preferably includes a sound database 125 which stores recorded versions of different sounds regularly played to callers (e.g., ring tones, busy signals, etc.) for various phone systems around the world. In addition, each node 115, 120 includes three additional databases: an authorized communication device database 130, an authorized codes database 135, and a nodes database 140.

Each telecommunication node 115, 120 further includes a call database 143. The call database associated with each telecommunication node stores information with respect to each call being handled by the node. One exemplary embodiment of call database 143 is schematically depicted in FIG. 2A. The schematic shown in FIG. 2A illustratively represents the state of the call database of originating node 115 at a particular moment in time. In the illustrative example depicted, originating node 115 is handling 11 calls to various locations around the world.

As shown in FIG. 2A, call database 143 comprises a plurality of records each of which stores data pertaining to one call being handled by the node. Each record (shown as a row) in call database 143 comprises a Call No. field, which stores a unique call identifier assigned by the system to each call. Each record also comprises calling device and called device fields, which store respectively the telephone numbers of the calling communication device from which the call was placed and of the called communication device to which the call was placed. The via node field stores the identity of another node in the system which cooperates with node 115 to connect the call from the calling communication device to the called communication device, as will be described in more detail below. The bandwidth-required field stores the minimum bandwidth required to carry the call in a compressed state. This may range from 8 Kb/s for a standard voice connection (or less for certain data transmissions), to many hundreds of Kb/s for video conferencing and other wideband applications. The database also comprises two fields which relate to the class of service requested by the caller. They are the guaranteed? field and share-link? field, the purpose of which will be described below.

Each telecommunication node 115, 120 further includes a link database 142 (FIG. 1B). The link database associated with each telecommunication node stores bandwidth utilization information regarding each of the node's ISDN lines. One exemplary embodiment of link database 142 is schematically depicted in FIG. 2B. The schematic shown in FIG. 2B illustratively represents the state of the link database of originating node 115 at a particular moment in time. In the depicted example, originating node 115 is provided with 5 distinct 64 Kb/s ISDN lines.

As shown in FIG. 2B, link database 142 comprises records pertaining to ISDN lines connecting a telecommunication node and its local switch. The records for one line are shown horizontally. As will be described in more detail below, the preferred embodiment achieves efficient utilization of broadband ISDN links by dynamically allocating the available bandwidth of each link to calls. Link database 142 tracks this dynamic allocation.

In particular, each record in link database 142 comprises a connected-to-node field which stores the identity of the node at the other end of each active ISDN link of originating node 115. During periods when an ISDN link is not active, a NOT ACTIVE flag is stored in this field, as shown, for example, with respect to link no. 5 in FIG. 2B.

Each record additionally comprises a bandwidth-utilization field which identifies calls being carried on the link, and the portion of the link bandwidth that has been allocated to each call. Each record also preferably comprises an available-bandwidth field which stores the amount of available (i.e., unallocated) bandwidth on the link.

Each telecommunication node 115, 120 further includes compression and decompression equipment 132, 134 (FIG. 1B). As those skilled in the art recognize, there exist many compression/decompression algorithms which may be employed to compress/decompress transmissions transmitted and received by nodes 115 and 120. In addition, as those skilled in the art recognize, this compression and decompression equipment may be implemented in hardware or software. Preferably, the present invention employs compression equipment with a compression ratio of at least 8:1.

An overview of the operation of the efficient link-utilization system of the present invention will now be described in connection with the flowchart shown in FIG. 3. The stages shown in FIG. 3 will then be explained in greater detail in connection with FIGS. 4–10.

Figure 3:
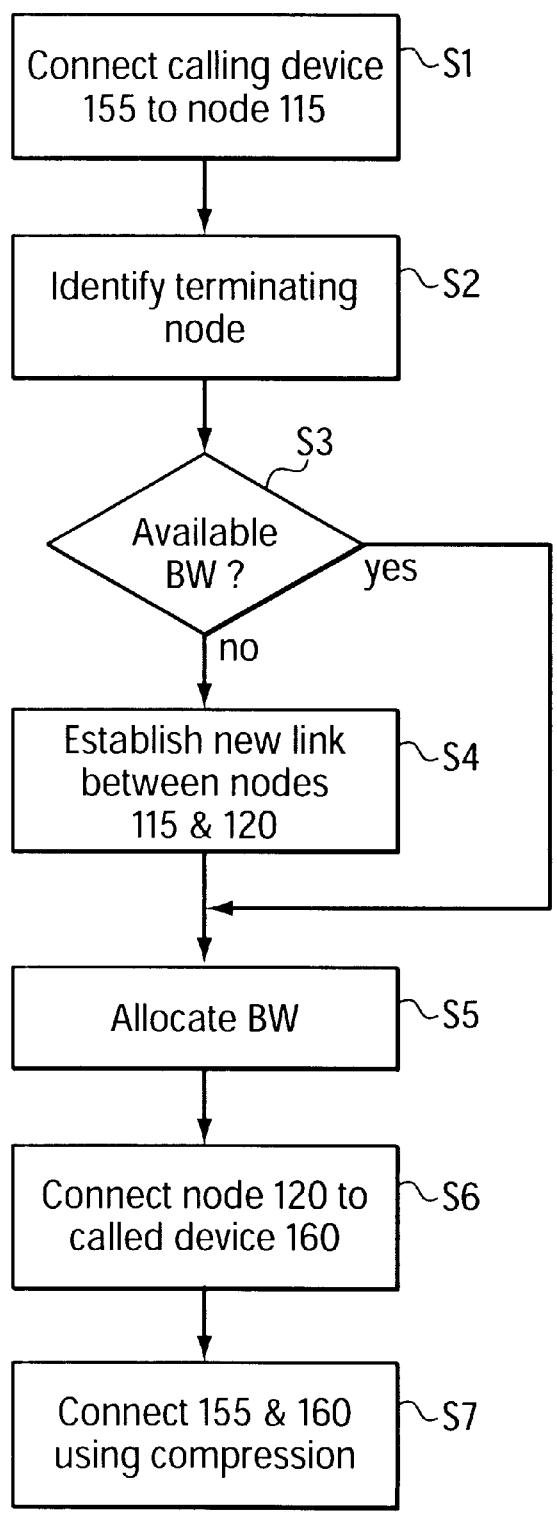
FIG. 3 is a flowchart depicting a seven part protocol for connecting a calling communication device to a called communication device.

As shown in FIG. 3, the system of the preferred embodiment preferably employs a seven-part protocol to establish a connection between a calling communication device, such as calling communication device 155, and a called communication device, such as called communication device 160. It should be noted that although FIG. 3 illustrates the protocol stages in a particular order, the person skilled in the relevant art will understand that the sequence of the stages may be varied. In addition, as described below, two or more stages may preferably be performed concurrently to improve efficiency of the system. The purpose of FIG. 3 is merely to elucidate the overall operation of the system.

In stage 1, the caller establishes a telephonic connection between calling communication device 155 and originating node 115, typically by dialing a number allocated to node 115 by the local service provider or preregistering for the service so that the caller's communication device is automatically connected to originating node 115 when it is taken "off-hook." Stage 1 also includes several steps (explained in detail below) the purposes of which are to verify that the caller is entitled to place calls via node 115 and to identify the number of called communication device 160.

In stage 2, node 115 identifies an appropriate terminating node 120 to connect originating node 115 to called communication device 160.

In stage 3, the system determines if there is sufficient available bandwidth on an existing ISDN connection between originating node 115 and terminating node 120 to carry the call, in compressed form, from calling communication device 155 to called communication device 160. The system may also determine whether bandwidth is available to route the call via other available technology or available link as taught for example in my copending applications Ser. No. 08/920,567, entitled Global Clearing Network, filed Aug. 29, 1997, which is hereby incorporated by reference in its entirety, and Ser. No. 08/927,443, entitled Method and System for Global Communications Network Management, filed Sep. 11, 1997 which is hereby incorporated by reference in its entirety. The system also determines whether the class of service requested by the caller requires that a new telephonic link be established to carry his call.

If decision stage 3 fails (i.e., there is not sufficient available bandwidth or the caller's class of service requires that a separate connection be established to carry his call), the system proceeds to stage 4 where nodes 115 and 120 cooperate to establish a new connection between the two nodes. Otherwise (i.e., there is sufficient available bandwidth on an active ISDN link and the class of service allows using the available bandwidth), the system bypasses stage 4 and proceeds directly to stage 5.

In stage 5, the system allocates available bandwidth to carry the call from calling communication device 155 to called communication device 160.

In stage 6, terminating node 120 establishes a connection with called communication device 160, typically by dialing the telephone number of called communication device 160 and waiting for called communication device 160 to be answered by the called party. This connection is typically established via PSTN lines.

Finally, in stage 7, nodes 115 and 120 cooperate to connect calling communication device 155 and called communication device 160 via the bandwidth allocated in stage 5.

The above protocol of FIG. 3 will now be described in more detail in connection with FIGS. 4–10. In FIGS. 4–10, triangular tokens represent steps performed by the caller or called party, rectangular tokens represent steps performed by originating node 115, and parallelogram shaped tokens represent steps performed by terminating node 120. Hexagonal tokens represent steps performed by both nodes 115 and 120.

Figure 4:
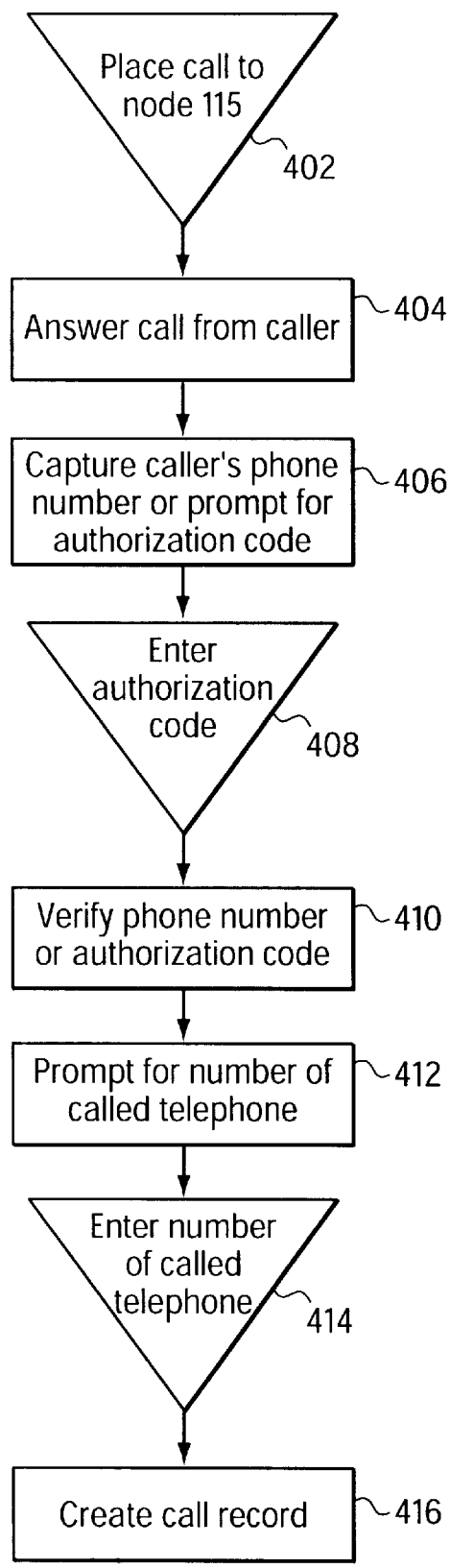
FIG. 4 is a flowchart depicting part one of the protocol of FIG. 3.

Stage 1 of the protocol will now be described in detail in connection with the flowchart depicted in FIG. 4. As noted, one objective of stage 1 is to establish a communication link, typically a telephonic link, between calling communication device 155 and originating node 115. Other objectives of this stage are to verify the authority of the calling party to use the system and to obtain from the calling party the number of called communication device 160. Turning to FIG. 4, in step 402, a caller places a call from calling communication device 155 to originating node 115 via switch 105. In step 404, originating node 115 answers the call thus establishing a connection between originating node 115 and calling communication device 155. Alternatively, the caller may be automatically connected to the node, as for example if the node is the caller's primary service provider, or if the caller has preregistered for the service.

The system then proceeds to steps 406–410 which illustrate two alternative ways of establishing that the caller is authorized to place calls via originating node 115. In the first method, originating node 115 employs the caller-ID or ANI feature available in many locations to capture the telephone number of calling communication device 155, as shown in step 406. In step 410, this number is compared to a list of authorized numbers stored in authorized communication device database 130, and if a match is established, the caller is permitted to place the call via originating node 115.

Returning to step 406, originating node 115 may alternatively prompt the caller to enter an authorization code using the keypad of calling communication device 155. In step 408, the caller enters the authorization code. In step 410, originating node 115 compares this authorization code to the list of authorized codes stored in authorized codes database 135, and if a match is established, the caller is permitted to place the call via originating node 115.

It should be recognized that although the embodiments of steps 406–410 have been described as alternatives, the system may employ both authorization techniques. Thus, originating node 115 might prompt the user to enter an authorization code only after a preliminary authorization has been established on the basis of the number of calling communication device 155.

Once the caller's credentials have been established, the system proceeds to step 412 wherein originating node 115 prompts the caller to enter the number of called communication device 160. In step 414, the caller enters the number of called communication device 160, which is stored by originating node 115. In step 416, originating node 115 establishes a call record in call database 143 for the new call.

In particular, node 115 assigns a unique code number to the call and stores this number in the appropriate field of the newly created record of call database 143. In addition, node 115 stores the number of calling communication device 155, the number of called communication device 160, the bandwidth required for the call, and the class of service information relating to the call in the newly created record of call database 143. With respect to the bandwidth requirement and the class of service information, the customer may in advance arrange with node 115 its choices with respect to these parameters, or alternatively, node 115 may prompt the user on a call-by-call basis to determine the caller's bandwidth requirements and the class of service desired. Also, the system may store information regarding the class of service desired for particular combinations of calling and called numbers and the bandwidth requirements for those calls. The system may also store historical information regarding the calling patterns of the caller, such as the average length of time of each call made by the caller. This information may be stored in a separate database.

In an alternative embodiment, originating node 115 may be maintained by the caller's service provider. In that event, the caller may directly dial the number of called communication device 160 which is then transmitted to originating node 115 via the SS7 network. Answer supervision is passed to the service provider who maintains switch 105 only when there is a connection to the destination.

Stage 2 of the protocol is described in connection with FIG. 5. The objective of stage 2 is to identify an appropriate terminating node via which to route the call to called communication device 160.

Figure 5:
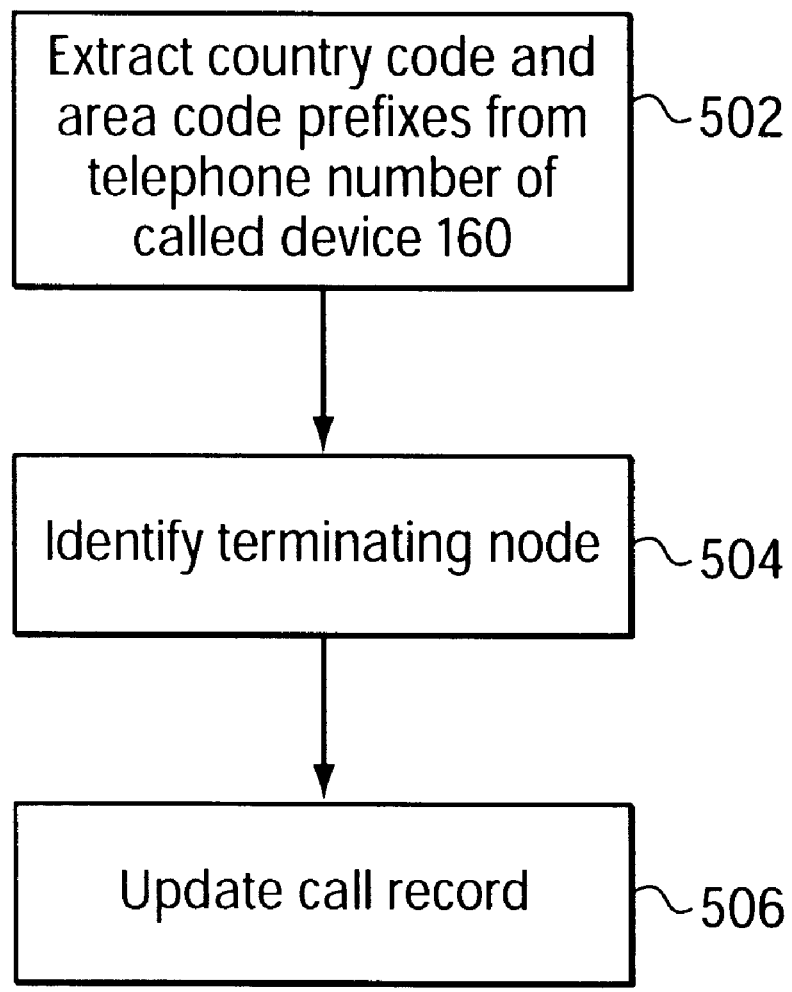
FIG. 5 is a flowchart depicting part two of the protocol of FIG. 3.

Turning to FIG. 5, in step 502, originating node 115 extracts the country code and area code prefixes from the number of called communication device 160. In step 504, originating node 115 uses the extracted country and area codes to identify a telecommunication node (e.g., node 120) suitable for terminating the call. Step 504 may be implemented in several ways. For example, in accordance with the teachings of my copending application Ser. No. 08/927,443, originating node 115 may transmit a service request for the call to a server that manages allocation and/or sales of telecommunications connect time on a global network. Illustratively, the server might identify a transmission route for the call that terminates at node 120, and transmit a service offer to node 115 to connect the call via that route at, for example, a particular price. If originating node 115 accepts the service offer, node 120 would be designated the terminating node for the call from calling communication device 155 to called communication device 160.

Alternatively, as taught in my copending application Ser. No. 08/811,071, entitled Automated Callback System, filed Mar. 3, 1997, which is hereby incorporated by reference in its entirety, the identity of a telecommunication node predesignated to serve as the terminating node for calls to the called location may be stored in node database 140. In that event, originating node 115 would use the extracted country and area codes to retrieve from node database 140 the identity, for example, of node 120, predesignated to serve as the terminating node for calls to called communication device 160.

In step 506, the via-node field of the appropriate call record in call database 143 is updated to reflect that the call will be routed via node 120.

Stage 3 of the protocol is described in detail in connection with FIG. 6. The objective of stage 3 is to determine whether there is sufficient available bandwidth on an existing telephonic connection between originating node 115 and terminating node 120 to carry the call from calling communication device 155 to called communication device 160 provided that the call has a class of service that allows use of such bandwidth.

Figure 6:
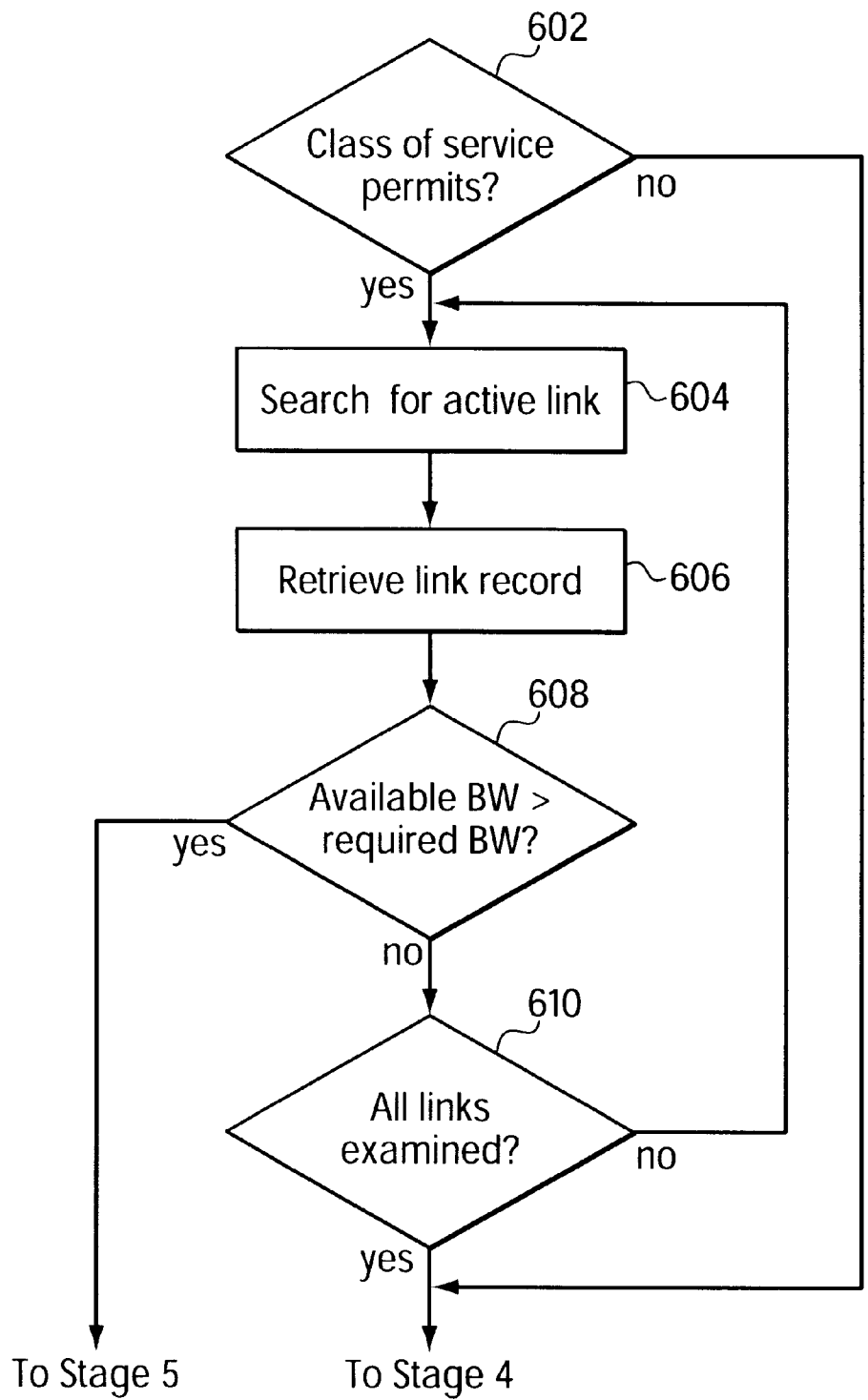
FIG. 6 is a flowchart depicting part three of the protocol of FIG. 3.

Turning to FIG. 6, in decision step 602, the system determines whether the caller's class of service permits the use of shared bandwidth on existing links to carry the call. This information is stored in the share-link? field of the appropriate call-record in call database 143. If decision step 602 fails, the system proceeds directly to stage 4 in which a new telephonic link connecting nodes 115 and 120 is established, as described below.

Otherwise, decision step 602 succeeds and the system proceeds to step 604 where originating node 115 searches the connected-to-node fields in link database 142 for an active ISDN link connecting nodes 115 and 120. When an active link connecting the two nodes is identified, originating node 115 retrieves the available bandwidth field of the link's record from link database 142, as depicted in step 606. In step 608, the retrieved available bandwidth is compared to the bandwidth requirements for the call from calling communication device 155 to called communication device 160. If the available bandwidth is greater than the bandwidth requirements for the call, then decision step 608 succeeds, and the system proceeds directly to stage 5 of FIG. 3, bypassing stage 4.

If, however, the available bandwidth is less than the bandwidth requirements for the call, then the system returns to step 604 and searches link database 142 for a second active link connecting nodes 115 and 120. The loop described by steps 604–608 is repeated until all active links in link database 142 are examined (step 610) or until an active link is identified with sufficient available bandwidth to carry the call from calling communication device 155 to called communication device 160.

If an active link with sufficient available bandwidth connecting nodes 115 and 120 is not ultimately identified, then stage 3 fails and the system proceeds to stage 4 in which a new ISDN link between the two nodes is established. Alternatively, the call may be routed via an alternative link as taught, for example, in my copending applications Ser. Nos. 08/920,567 and 08/927,443. As noted, the new link is also established if the class of service for the call requires it.

Stage 4 will now be described in connection with FIG. 7. The method for establishing a new telephonic connection between nodes 115 and 120 is also disclosed in my copending application Ser. No. 08/811,071.

Figure 7:
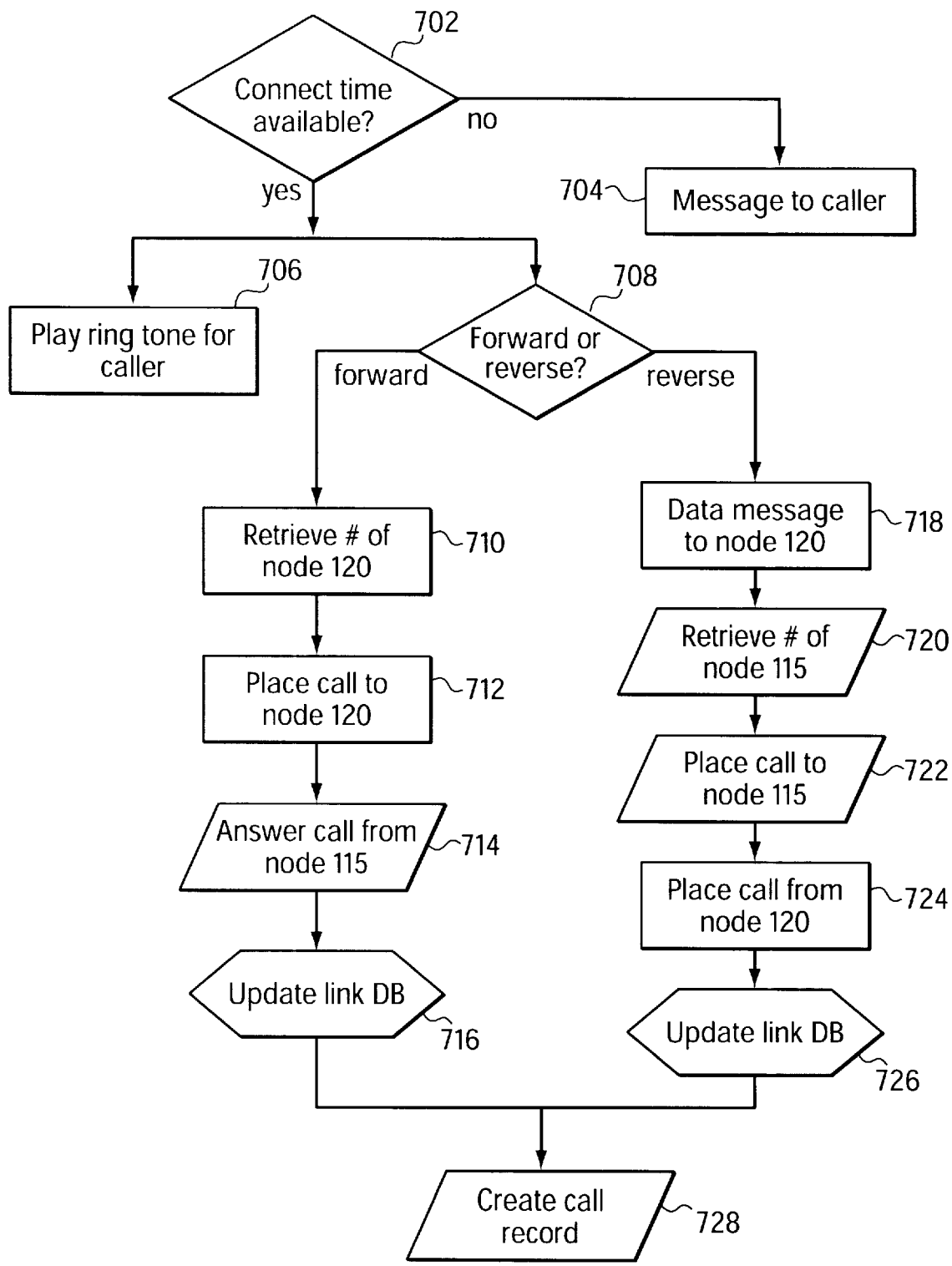
FIG. 7 is a flowchart depicting part four of the protocol of FIG. 3.

Turning to FIG. 7, in decision step 702 originating node 115 ascertains whether connect time is available from communication device network 165 to connect the caller to the called party. This determination may be made based on information available from the SS7 or C7 network or from terminating node 120 of switch 110 via data link 145. If connect time is not available, decision step 702 fails, and the system proceeds to step 704 wherein originating node 115 transmits a pre-recorded message to calling communication device 155 informing the caller that the call cannot be completed and asking the caller to try again at a later time. Alternatively, the system may route the call via an alternative path.

If connect time is available, then decision step 702 succeeds. In that event, originating node 115 enters a mode in which it concurrently plays an appropriate ring tone for the caller and initiates the connection process. In this way, the system creates for the caller the impression that his call has been connected directly to called communication device 160, although the connection with called communication device 160 has not yet been established.

Specifically, in step 706, originating node 115 uses the country code and area code prefixes to retrieve from sound database 125 the appropriate recorded ring tone for the location being called and transmits the recorded ring tone to the caller without passing supervision to switch 105. Concurrently, in decision step 708, the system determines whether it will be less expensive to establish a telephonic connection between nodes 115 and 120 by placing a call from node 115 to node 120 (i.e., the forward direction) or by placing a call from node 120 to node 115 (i.e., the reverse or callback direction).

If it is determined that the forward direction is less expensive, then the system proceeds to step 710 wherein node 115 retrieves from node database 140 the number of an ISDN line of node 120. In step 712, node 115 places a call to that number via network 165 and switches 105 and 110. In step 714, node 120 answers the call from node 115, thus establishing an active ISDN link between the two nodes. In step 716, both nodes 115 and 120 update their respective link databases 142 to reflect activation of this ISDN link. In addition, when nodes 115, 120 form part of a larger network, the network server is also informed of activation of the ISDN link, so as to update its routing tables to reflect the current state of the network.

Alternatively, if it is determined in decision step 706 that it is less expensive to establish a link between nodes 115 and 120 in the callback direction, then the system proceeds to step 718 wherein originating node 115 transmits to terminating node 120 a data message comprising the identity of originating node 115 and the number of called communication device 160. In addition, the message may contain service or other information that a person skilled in the art may find useful for facilitating communication between nodes. This data message is typically less than 128 bits. The data message may be transmitted via data line 145. Alternatively, if an active ISDN link exists between nodes 115 and 120, the data message may be transmitted via the D channel of the active ISDN link.

Upon receipt of the data message from originating node 115, terminating node 120 executes step 720 wherein it extracts from the message the identification code for originating node 115 and uses it to retrieve from node database 140 the number of an ISDN line connecting originating node 115 to switch 105. Terminating node 120 immediately places a call to that number via an ISDN line connecting node 120 to switch 110, as depicted in step 722. In step 724, originating node 115 answers the call from terminating node 120, thus establishing an active ISDN link between the two nodes. In step 726, both nodes 115 and 120 update their respective link databases 142 to reflect activation of this ISDN link. In step 728, node 120 creates a call record for its call database 143 and stores therein the particulars regarding the call from calling communication device 155 to called communication device 160.

Stage 5 of FIG. 3 will now be explained with reference to the flowchart in FIG. 8. The objective of stage 5 is to allocate available bandwidth on an active ISDN link to carry the call from calling communication device 155 to called communication device 160.

Figure 8:
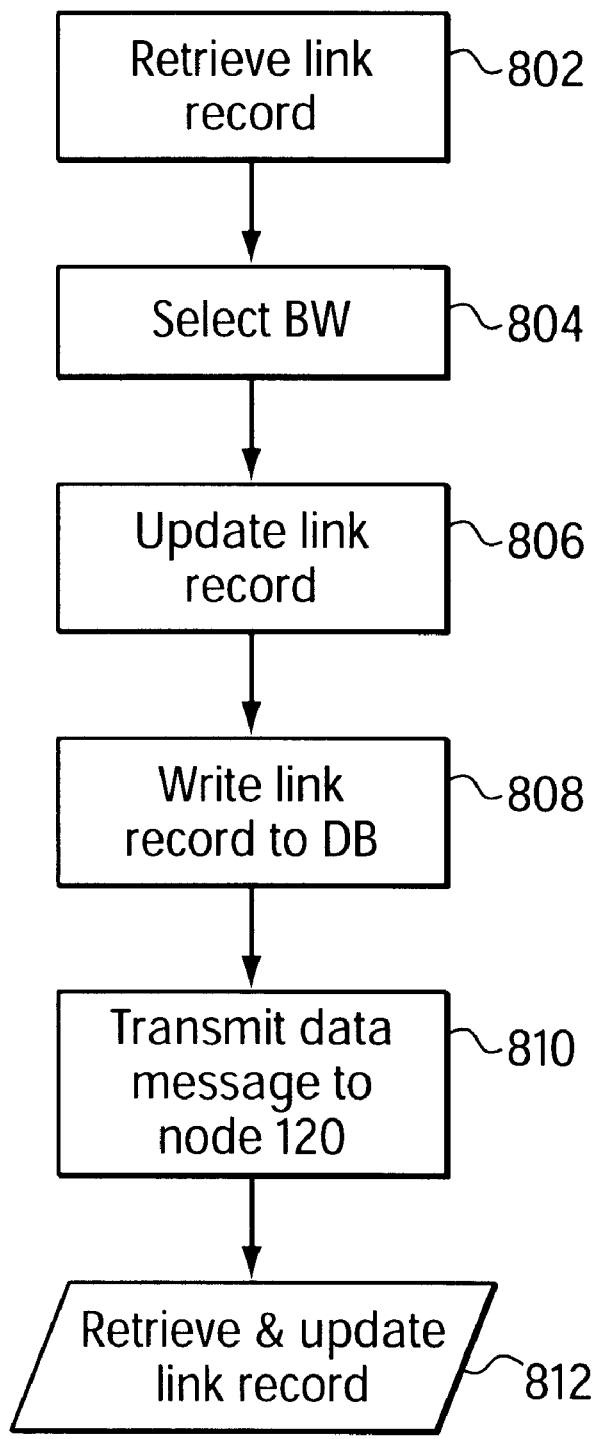
FIG. 8 is a flowchart depicting part five of the protocol of FIG. 3.

Turning to FIG. 8, in step 802, originating node 115 retrieves the record of an active ISDN link with sufficient available bandwidth to carry the call between calling communication device 155 and called communication device 160. The particular record retrieved depends on whether or not decision stage 3 of the protocol, described above, succeeded. If stage 3 succeeded, then the record retrieved is that of the active ISDN link identified in step 604 of stage 3. If stage 3 failed, then the record retrieved is that of the active ISDN link created in stage 4. For purposes of illustration, it is assumed that FIG. 9A represents a link record retrieved from link database 142 in step 802.

In step 804, originating node 115 examines the bandwidth-utilization field of the retrieved record and selects a portion of the bandwidth adequate to handle the call from calling communication device 155 to called communication device 160. In step 806, originating node 115 reserves this bandwidth by updating the bandwidth utilization field to reflect that the selected bandwidth has been allocated to the call. The available-bandwidth field is also updated to reflect the reduced available bandwidth on the link. FIG. 9B schematically illustrates the state of the link record after execution of step 806. In step 808, originating node 115 writes the updated record back to link database 142.

In step 810, originating node 115 transmits a data message to terminating node 120 comprising the identity of the ISDN link chosen to carry the call and the particular bandwidth range allocated to the call. This data message may be transmitted via data line 145 or alternatively via a D-channel of any active ISDN link connecting nodes 115 and 120 (using, e.g., the UUI technology protocol).

In step 812, terminating node 120 retrieves the record of the active ISDN link identified in the data message from its link database 142 and updates the record in a manner analogous to that described above in connection with steps 802, 806, and 808.

Stage 6 of FIG. 3 will now be described in connection with FIGS. 10A–F. The objective of stage 6 is to establish a telephonic connection between terminating node 120 and called communication device 160.

Figure 10A:
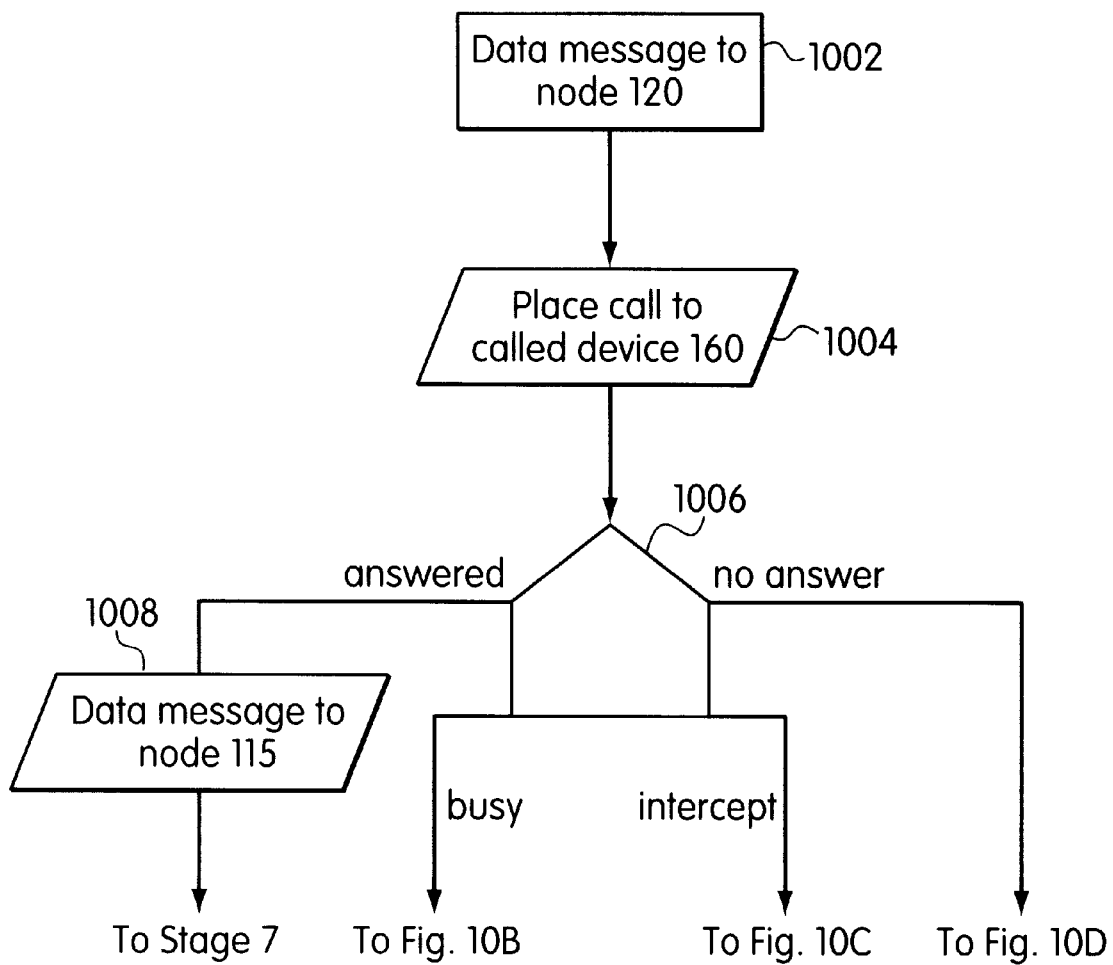
FIGS. 10A–F are flowcharts depicting part six of the protocol of FIG. 3.
Figure 10B:
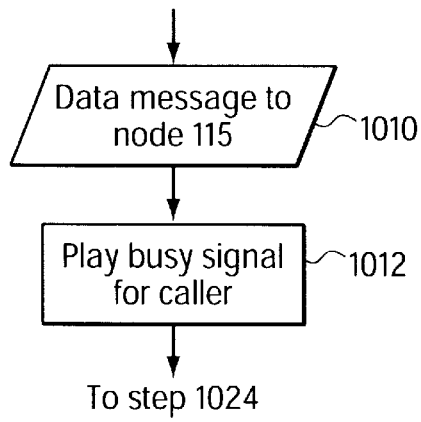
Figure 10C:
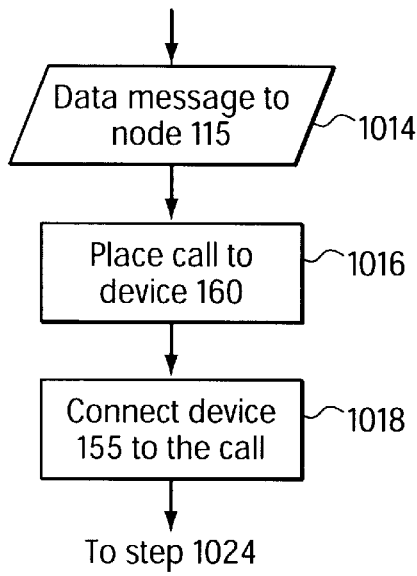
Figure 10D:
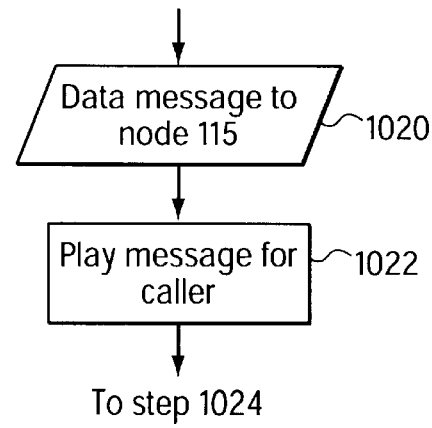
Figure 10E:
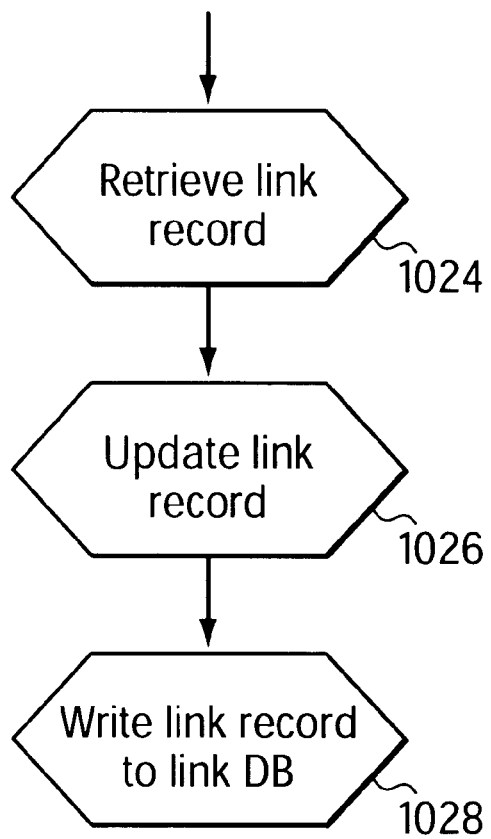
Figure 10F:
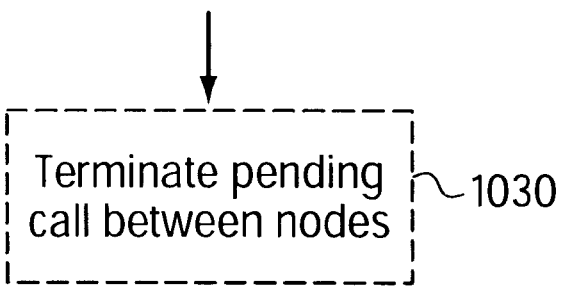

Turning to FIG. 10A, in step 1002 originating node 115 transmits a data message to terminating node 120 comprising the number of called communication device 160. This data message may be transmitted via data line 145 or via a D channel of any active ISDN link connecting nodes 115 and 120. Although for ease of illustration this data message and the data message transmitted in step 716 of FIG. 7 are described separately, it should be recognized that in practice the two messages may preferably be transmitted jointly as part of a single data transmission, as taught, for example, in my copending application, Ser No. 08/811,071.

In step 1004, terminating node 120 uses the received number to place a call to called communication device 160. As noted in my copending application, Ser. No. 08/811,071, the call to called communication device 160 may be timed so as to synchronize its completion with establishment of a new link connecting nodes 115 and 120 as described above in connection with stage 4.

As shown in decision step 1006, the call to called communication device 160 will result in one of four outcomes. The first possibility is that the call from terminating node 120 to called communication device 160 is answered by the called party. In that event, the system proceeds to step 1008 wherein terminating node 120 transmits a data message to originating node 115 indicating that the called party has answered called communication device 160. Upon receipt of this data message, the system proceeds to stage 7, wherein nodes 115 and 120 cooperate to connect the caller and the called party via the ISDN bandwidth that has been allocated to the call.

In particular, as originating node 115 receives transmissions of voice or data from calling communication device 155, it compresses them, as known in the art, using compression equipment 132 and transmits the compressed transmissions to terminating node 120 via the allocated bandwidth on the active ISDN link. Terminating node 120 receives these transmissions, decompresses them using decompression equipment 134, and passes them along to the called party via the telephonic connection connecting terminating node 120 and called communication device 160. Similarly, as terminating node 120 receives voice or data transmissions from called communication device 160, it compresses them using compression equipment 132, and transmits the compressed transmissions to originating node 115 via the bandwidth allocated to the call on the active ISDN link. Originating node 115 receives these transmissions, decompresses them using decompression equipment 134, and passes the decompressed transmissions along to the caller via the telephonic connection connecting originating node 115 and calling communication device 155.

In this way the system connects calling communication device 155 to called communication device 160 via the allocated bandwidth on the active ISDN link connecting originating node 115 and terminating node 120.

The second possibility is that the call from terminating node 120 to called communication device 160 results in a busy signal. In that event, the system proceeds to step 1010 wherein terminating node 120 transmits a data message to originating node 115 indicating that called communication device 160 is busy.

In step 1012, originating node 115 retrieves from sound database 125 the appropriate busy signal for the location of terminating node 120 and plays the busy signal for the caller. The system then proceeds to step 1024, which is described below.

The third possibility is that the call to called communication device 160 results in an operator intercept. This will occur, for example, if called communication device 160 has been disconnected. In that case, the system proceeds to step 1014 wherein terminating node 120 transmits a data message to originating node 115 indicating that the call to called communication device 160 resulted in an operator intercept. In step 1016, upon receipt of the data message from terminating node 120, originating node 115 places a call via switch 105 to called communication device 160 via network 165, and then, in step 1018, immediately connects calling communication device 155 to that call. When the call goes through, the caller hears the operator intercept message without incurring long distance charges because operator intercepts do not result in a toll charge. Alternatively, the system may transmit the operator intercept to the caller via available ISDN bandwidth on an already established link. The system then proceeds to step 1024, which is described below.

The fourth possibility is that the call from terminating node 120 to called communication device 160 results in no answer for some predetermined time (e.g., 40 seconds). In that event, the system proceeds to step 1020 wherein terminating node 120 transmits a data message to originating node 115 that there is no answer at called communication device 160. Upon receipt of the data message from terminating node 120, originating node 115 replaces the ring tone played to the caller with a pre-recorded message informing the caller that there is no answer and asking the caller to try again at a later time, as depicted in step 1022. Alternatively, the system may continue to provide a ring tone to the caller until the caller hangs up. The system then proceeds to step 1024.

In step 1024, nodes 115 and 120 retrieve from their respective link data bases 142 the record pertaining to the active ISDN link which had been designated to carry the call from calling communication device 155 to called communication device 160. In step 1026, the retrieved records are updated to reflect the fact that the allocated bandwidth will not be used to carry the call. The updated records are then written back to link data base 142, as depicted in step 1028.

It should be noted that execution of steps 1024–1028 may not always be necessary. In particular, in accordance with a preferred embodiment of my copending application Ser. No. 08/811,071, steps 714 and 724 in FIG. 7 of stage 4 above, in which a long distance call from one node is answered by the other node, are not executed until it is established that called communication device 160 has answered the call from terminating node 120. In this way, the system guarantees that long distance charges for connecting nodes 115 and 120 are not incurred unless it is known that the called party can be reached.

Consequently, in situations where decision stage 3 fails and stage 4 is executed, a busy signal at called communication device 160 in step 1006 of FIG. 10 does not result in execution of steps 1024–1028, because the ISDN link connecting nodes 115 and 120 has not yet been established and bandwidth has not yet been allocated (stage 5) to carry the call from calling communication device 155 to called communication device 160. Instead, when the call from terminating node 120 to called communication device 160 results in a busy signal, the system simply terminates the pending call between nodes 115 and 120, as depicted in step 1030, shown in broken lines in FIG. 10F.

Node operators may use the efficient link utilization system disclosed herein to provide both guaranteed call connection service and non-guaranteed call connection service to customers. Guaranteed call connection service means that the node operator guarantees that the connection between calling communication device 155 and called communication device 160 will be maintained as long as both the caller and called party remain on the line. Non-guaranteed call connection service means that the connection between calling communication device 155 and called communication device 160 may be terminated by the node operator at any time. In general, it is contemplated that the price charged by a node operator for guaranteed service will be higher than that charged for non-guaranteed service. This capability is further described in connection with FIGS. 11A–F and 12.

Assume for purposes of illustration that the state of a particular link record in link databases 142 of nodes 115 and 120 at a particular moment in time is as shown in FIGS. 11A and 11B, respectively. The flowchart shown in FIG. 12 depicts the system response to termination of a call carried on the link.

Figure 12:
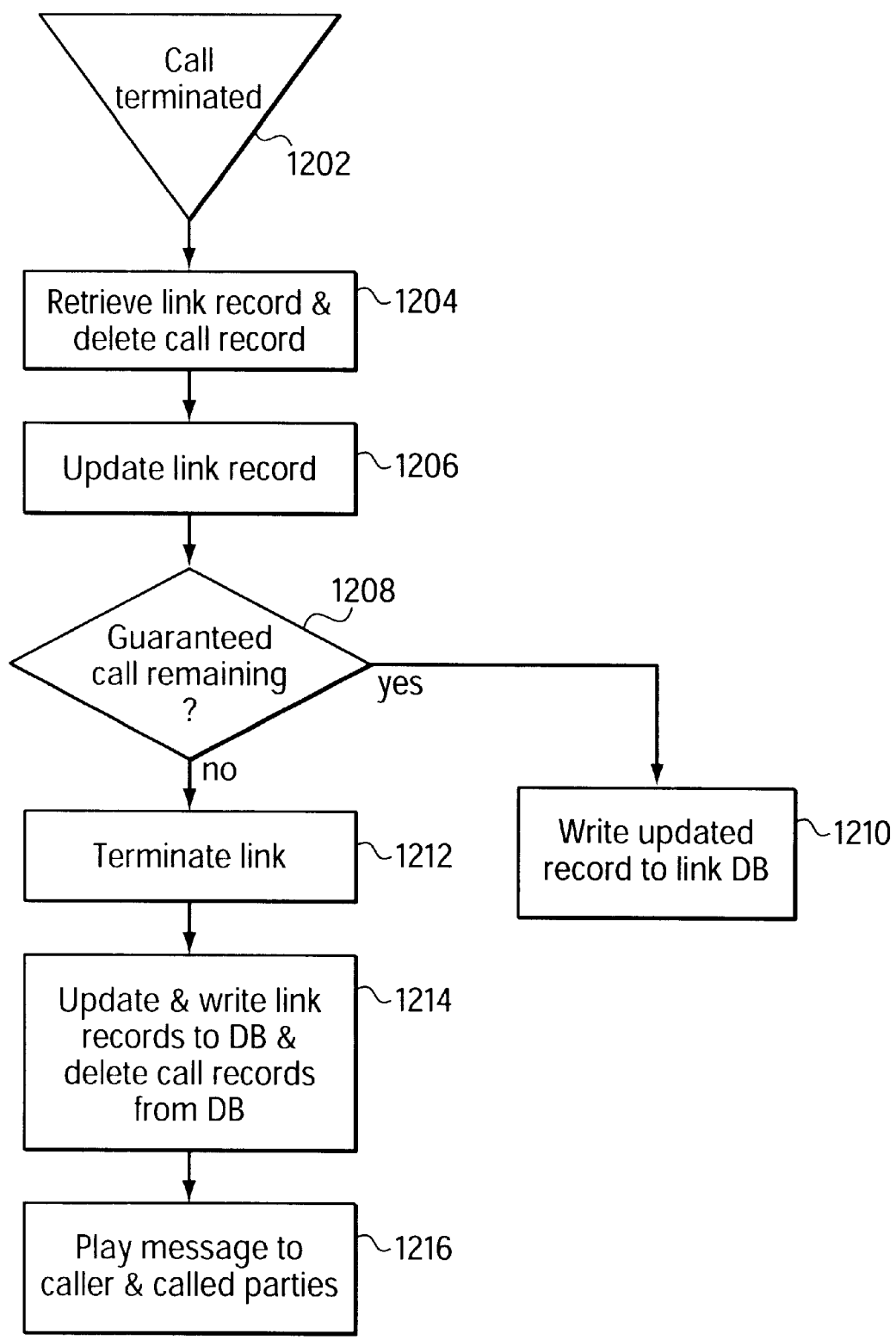
FIG. 12 is a flowchart depicting the system response to termination of a call being carried between two nodes.

Turning to FIG. 12, when a call being carried on an active ISDN link is terminated (step 1202), nodes 115 and 120 recognize that a call has been terminated and retrieve from their respective link databases 142 the record pertaining to the ISDN link that was carrying the terminated call, as depicted in step 1204. Also in step 1204, the nodes delete the call record for the call from call database 143.

In step 1206, nodes 115 and 120 update the retrieved record to reflect deallocation of the bandwidth that had been employed to carry the terminated call. FIGS. 11C and 11D schematically represent the state of the link records at nodes 115 and 120, respectively, after execution of step 1206.

In decision step 1208, at least one of nodes 115 and 120 examines the remaining calls being carried on the link and determines whether any of the remaining calls has requested a guaranteed connection. If any of the remaining calls has requested a guaranteed connection, then decision step 1208 succeeds, and the ISDN link connecting nodes 115 and 120 is maintained. In step 1210, nodes 115 and 120 write the updated link record to their respective link databases 142.

If, on the other hand, none of the remaining calls being carried on the link has requested a guaranteed connection, then decision step 1208 fails, and the system proceeds to step 1212 wherein the ISDN link connecting nodes 115 and 120 is terminated unless maintenance of the link can be justified on other grounds. For example, if the total cost of maintaining the link is less than the revenue being collected from all callers employing the link, then the link will be maintained. Alternatively, even if the cost of maintaining the link is greater than the immediate revenue being collected from callers, one or more of the node operators might prefer to maintain the link for some other business reason, e.g., a volume commitment by the calling node to the called node or an agreement that requires allocation of proportionate returns to the calling location for every call made to the called location.

If the link is to be terminated, then, in step 1214, nodes 115 and 120 update their respective link records to reflect that the ISDN link is no longer active. FIGS. 11E and 11F schematically represent the state of the link records at nodes 115 and 120, respectively, after execution of step 1214. Also in step 1214, nodes 115 and 120 delete the call records for the terminated calls from call database 143.

The system then proceeds to step 1216 wherein nodes 115 and 120 play a message to all parties who were communicating via the ISDN link to the effect that the link has been terminated by the node operator.

Alternatively, if there exists available bandwidth on other established links connecting the originating and terminating nodes, the system may dynamically remap some or all of the non-guaranteed connections to that available bandwidth. This remapping may be performed transparently to the calling and called parties by seamlessly changing (at a particular instant) the transmission path for each call from the ISDN link to be terminated, to another active ISDN link with available bandwidth.

By offering non-guaranteed service, node operators can offer lower rates to those customers who are not concerned with maintaining control over the length of their calls. These low rates encourage callers to frequently place calls to remote parties who they otherwise might not call because of the higher cost of a guaranteed long distance connection. In this way, the node operator is able to improve link utilization and thus increase the revenue generated by each active ISDN link.

The system may also be programmed to periodically consolidate link usage, by dynamically remapping all calls on a particular link to other links with available bandwidth. This may be performed transparently to the calling and called parties by seamlessly changing (at a particular instant) the transmission paths from one ISDN link to another. Once all of the calls on a particular link have been transferred to other links, the particular link may be terminated, which further enhances the efficiency of the system.

In the above description, the connection between originating node 115 and terminating node 120 was established via a direct call from one of the nodes to the other. However, a direct call from the originating node to the terminating node may not constitute a substantially least cost routing path for a call between the two locations. For example, when originating node 115 and terminating node 120 are both located in countries which do not permit competition among communication device carriers, the cost of a forward or reverse call between originating node 115 and terminating node 120 may be higher than the sum of the costs of two calls to originating node 115 and terminating node 120 from a transit node located in a country where such competition is permitted. In such circumstances, a less expensive way to connect originating node 115 to terminating node 120 is via the transit node located in the third country.

More generally, as disclosed in my copending application Ser. No. 08/811,071, it will be recognized that a call from an originating node to a terminating node may be connected via a call routing path comprising any number of calling legs, each leg bridging two nodes in the call routing path. One or more of these calling legs may employ an ISDN link. As noted, these ISDN links frequently have substantial unutilized bandwidth available to carry additional calls. Thus, the principles of the present invention may also be employed in networks which route calls from an originating node to a terminating node via a plurality of transit nodes. An illustrative example of this aspect of the present invention is described in connection with FIGS. 13–15.

Figure 13:
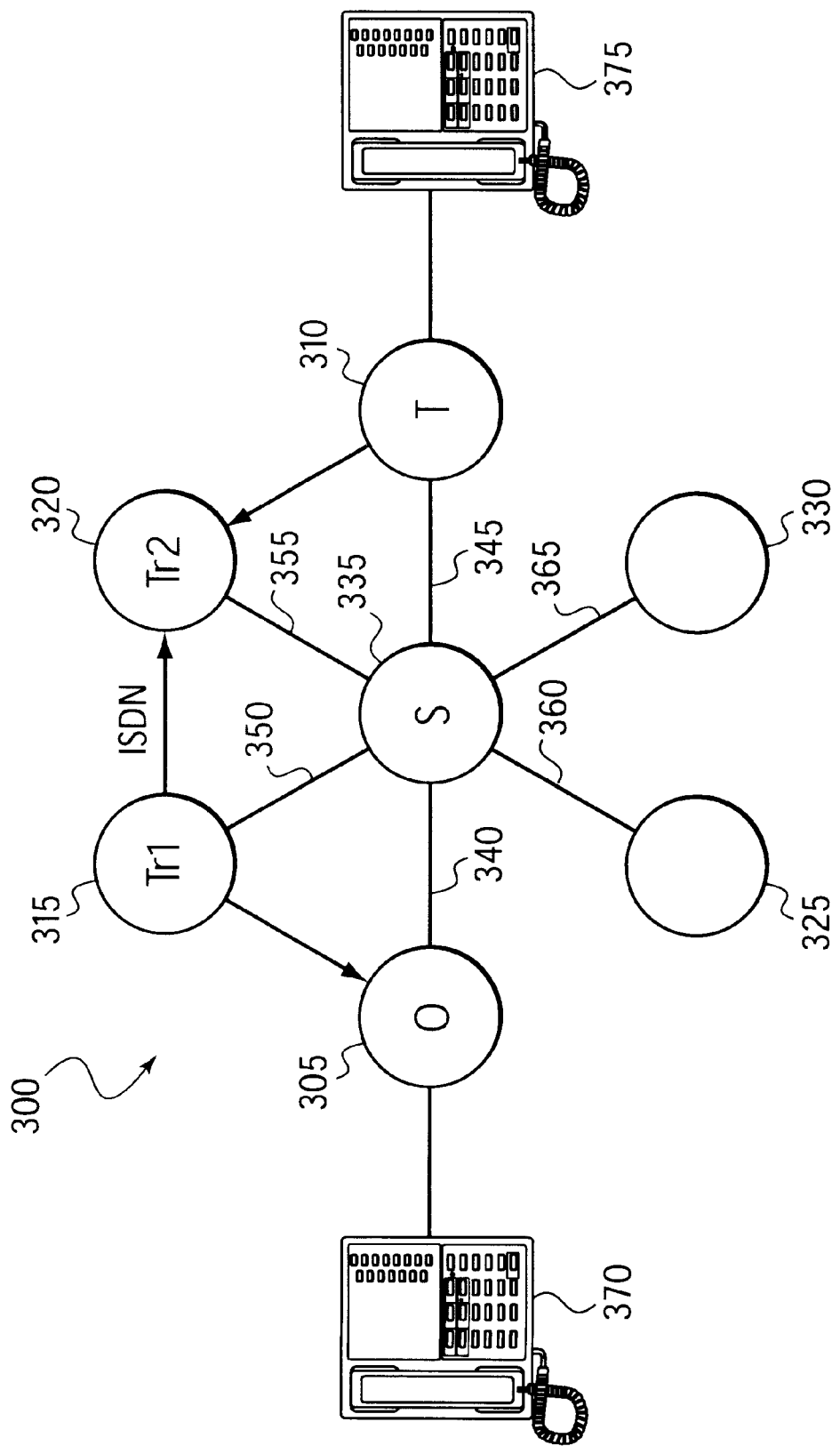
FIG. 13 is a block diagram of a global nodal network architecture suitable for implementing the efficient link utilization system of the present invention.

Turning to FIG. 13, there is shown a global nodal network 300 suitable for connecting a calling communication device 370 and a called communication device 375. Global network 300 comprises an originating node 305, and a terminating node 310, as well as additional nodes shown as nodes 315–330. Like nodes 115 and 120 described above, nodes 305–330 are preferably computer-based local telecommunication nodes capable of creating a connection between two remote parties each of whom is independently connected to the node via a communication device voice line. Also, although not shown in FIG. 13, each node 305–330 is preferably provided with a sound database 125, an authorized communication device database 130, an authorized codes database 135, a nodes database 140, a call database 143, and a link database 142 like those described above in connection with FIG. 2.

Global network 300 further comprises a server node 335 which is connected to the nodes in the global network via a data links, such as data lines 340–365. As noted above, these data connections may alternatively be achieved by another suitable data or voice link employing wired or wireless technologies. As described in more detail below, server node 335 serves to clear transactions and authorize and coordinate all calls placed via global network 300.

The operation of the efficient-link utilization system of the present invention in a global network environment will now be described in connection with the flowchart shown in FIG. 14.

Figure 14:
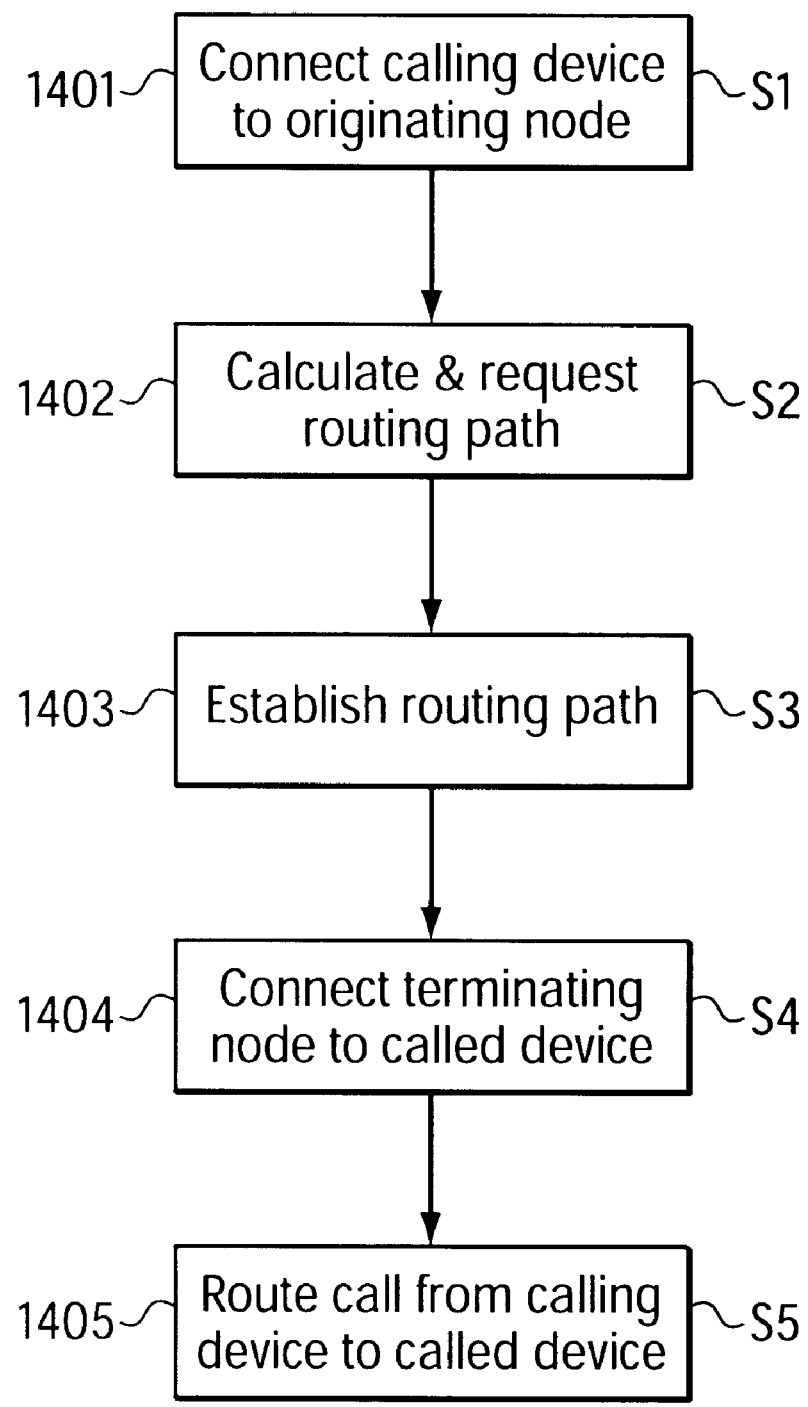
FIG. 14 is a flowchart depicting a five part protocol for connecting a calling communication device to a called communication device.

FIG. 14 shows a five step protocol for establishing a connection between a calling communication device, such as calling communication device 370 and a called communication device, such as called communication device 375. It should be noted that although FIG. 14 illustrates the protocol stages in a particular order, a person skilled in the relevant art will understand that the sequence of the stages ay be varied. Also, two or more stages may preferably be performed concurrently to improve the speed and efficiency of the system in accordance, for example, with the teachings of my copending application Ser. No. 08/811,071. The purpose of FIG. 14 is to elucidate the overall operation of the system.

In stage 1 (illustrated as 1401), the caller establishes a telephonic connection between calling communication device 370 and originating node 305, typically by dialing a telephone number allocated to node 305 by the local communication device service provider. Alternatively, the connection may be automatically established, as described above. Stage 1 also includes several steps that verify that the caller is entitled to place calls via node 115 and identify the number of called communication device 375. The steps performed by the system to accomplish stage 1 are the same in this embodiment as described above in connection with FIG. 4.

In stage 2 (identified as 1402), originating node 305 calculates and requests a routing path for the call. Several preferred embodiments may be employed to implement stage 2. For example, as noted in my copending patent application, Ser. No. 08/811,071, many cost and non-cost factors may be considered by the system in calculating a cost-efficient routing for the call from calling communication device 370 to called communication device 375. For example, considerations such as service quality, credit imbalances between nodes, contractual obligations between nodes, tax implications, and many others may affect the choice of routing for a call.

Also, as noted therein, the total number of possible routing paths between an originating node and a terminating node in the global network rises steeply as the number of nodes increases. Thus, unless the number of nodes is very small, the least cost routing path cannot practically be calculated by a brute force cost comparison of each potential path. In practice, however, a sufficiently optimal approximation of the least cost routing path may be determined using various heuristic techniques as known in the art, so as to determine a cost-efficient path.

Stage 2 may also be implemented in accordance with the teachings of my copending application Ser. No. 08/927,443. That application discloses a system and method for allocating and establishing cost-efficient routings for telecommunications connecting a calling location and a called location. Service providers submit information to a centralized server node that stores data relating to cost and service parameters for routing a communication from a first location to a second location. The server node receives data representing rate information, evaluates it, and generates therefrom a rate-table database comprising efficient routing paths for connecting transmissions between locations in a communications switching network.

Originating node 115 may submit a purchase request to the server node. The server node identifies efficient routes that meet the requester's requirements and brokers sale of connect time via a particular route from the service providers to originating node 115.

Also in stage 2, once a cost-efficient path has been determined, originating node 305 transmits a service request to server node 335, requesting that the calculated cost-efficient routing path be established to carry the call from calling communication device 370 to called communication device 375. The call routing request may include a class of service component indicative of the class of service requested by the caller. Alternatively, class of service information for various callers and/or called parties may be stored in a database in server node 335.

In stage 3 (illustrated as 1403), the system establishes the requested routing path linking originating node 305 and terminating node 310. In the example shown in FIG. 13, this routing path comprises two transit nodes 315, 320. Thus, originating node 305 and terminating node 310 are connected via three calling legs: a first leg bridging nodes 305 and 315; a second leg bridging nodes 315 and 320; and a third leg bridging nodes 320 and 310. The steps performed by the system to execute stage 3 are further described in connection with FIG. 15.

Figure 15:
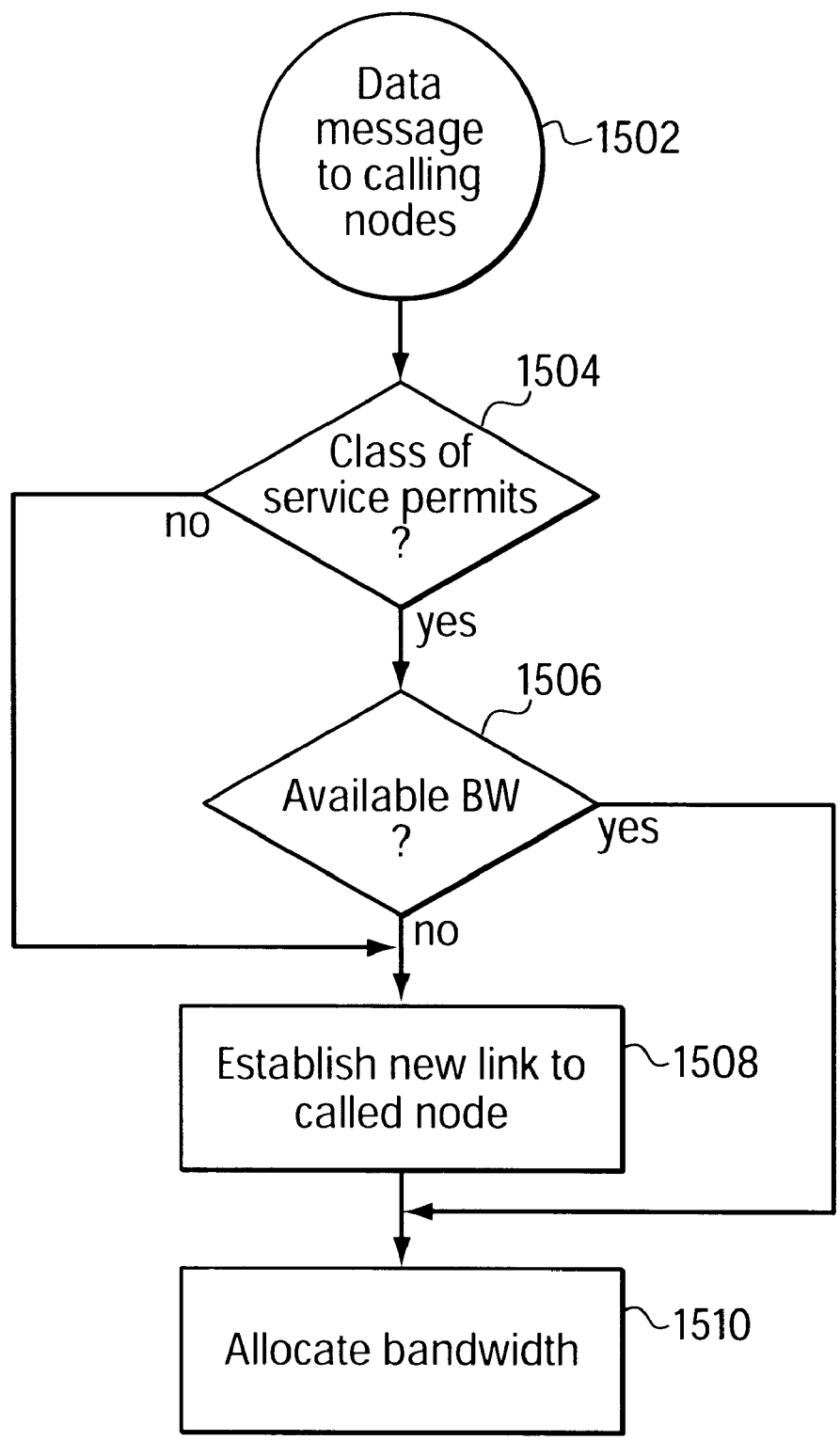
FIG. 15 is a flowchart depicting part three of the protocol of FIG. 14.

Turning to FIG. 15, in step 1502, server node 335 transmits a data message via data lines 340–365 to every "calling" node in the cost-efficient routing path. A calling node is a node which is responsible for placing one of the calling legs in the routing path. Each data message transmitted by server node 335 comprises the identity of a "called" node, i.e., the node responsible for receiving the calling leg from the calling node. The data message may further comprise a class of service component to inform the calling nodes of the class of service requested by the caller.

Each transit node in the cost-efficient routing path anchors two calling legs in the path. Thus, each transit node may serve as the calling node for two calling legs; as the called node for two calling legs; or as the calling node for one calling leg and the called node for a second calling leg. In the example shown in FIG. 13, transit node 315 serves as the calling node for the first and second calling legs of the routing path and transit node 320 serves as the called node for the second and third calling legs of the routing path.

The originating node must serve as either the calling node or the called node of the first calling leg in the routing path and the terminating node must serve as either the calling node or the called node in the final calling leg of the routing path. In the example shown in FIG. 13, originating node 305 serves as the called node for the first calling leg in the routing path and terminating node 310 serves as the calling node for the third, and last, calling leg in the routing path.

In decision step 1504, each calling node determines whether the class of service requested by the caller permits the call to be routed via available bandwidth on an existing telephonic link. If decision step 1504 fails, then the system proceeds directly to step 1508 where a new telephonic link is established between the calling node and its respective called node, as described below.

Otherwise, if decision step 1504 succeeds, the system proceeds to decision step 1506 where it is determined whether there is sufficient available bandwidth on an existing ISDN link connecting the calling node with its respective called node. As in the first preferred embodiment described above, this step is performed by searching link database 142 until a link with available bandwidth is identified, or until all records in link database 142 are searched.

If decision step 1506 fails (i.e., there is not sufficient available bandwidth), the system proceeds to step 1508 where the calling node and its respective called node cooperate to establish a new telephonic link between them. In particular, this telephonic link is established by placing a call from the calling node to its respective called node, which is answered by the called node. As noted in my copending application, Ser. No. 08/811,071, establishment of the calling legs may be timed so as to synchronize their completion with each other and with establishment of a connection between terminating node 310 and called communication device 375, described below in connection with stage 4.

If decision step 1506 succeeds (i.e., there is sufficient available bandwidth on an active ISDN link and the class of service allows using the bandwidth), the system bypasses step 1508 and proceeds directly to step 1510.

In step 1510, each calling node allocates bandwidth to carry the calling leg connecting it to its respective called node. As in the first preferred embodiment described above, this step is performed by updating the link database at each calling node to reflect allocation of particular bandwidth to handle the calling leg. The databases at each called node are similarly updated.

Returning to FIG. 14, in stage 4, terminating node 310 establishes a telephonic connection with called communication device 375. The steps performed by the system to establish this connection are the same as those described above with respect to the first preferred embodiment. Also, as described above and in my copending application Ser. No. 08/811,071, if terminating node 375 is unable to reach the called party because the call to called communication device 375 results in a busy signal, operator intercept, or no answer, the call routing is canceled and the caller is informed that the system was unable to reach the called party.

In stage 5 (illustrated as 1405), the system routes the call from calling communication device 370 to called communication device 375 via the routing path established in stages 1, 3, and 4.

Thus, as described above, the global network shown in FIG. 13 is able to efficiently employ existing active links connecting nodes in the cost-efficient routing path to carry the call from calling communication device 370 to called communication device 375.

While the invention has been described in conjunction with specific embodiments, it is evident that numerous alternatives, modifications, and variations will be apparent to those skilled in the art in light of the foregoing description.

What is claimed is:

1. A method of connecting a call from a calling communication device to a called communication device via a call routing path comprising two or more telecommunications nodes, comprising:

establishing a first connection between the calling communication device and a first telecommunications node;

identifying an existing telephonic link with available bandwidth connecting the first telecommunication node and a second telecommunication node using a link database containing bandwidth utilization of the existing telephonic link and a call database containing data relating to cost and class of service requested by a user;

allocating at least a portion of the available bandwidth to carry the call from the calling communication device to the called communication device based on a comparison of information from the link database with that of the call database;

establishing a second connection between the second telecommunication node and the called communication device, and connecting the calling communication device to the called communication device via the first connection, the second connection, and the allocated bandwidth of the existing telephonic link.

2. The method of claim 1, wherein the calling communication device and the called communication device are telephones.

3. The method of claim 1, wherein the calling communication device and the called communication device are fax machines.

4. The method of claim 1, wherein communications transmitted over the existing telephonic link are compressed prior to transmission.

5. The method of claim 4, wherein the compression ratio is at least 8:1.

6. A method of connecting a call from a calling communication device to a called communication device via a call routing path connecting a first telecommunication node and a second telecommunication node, comprising:

establishing a first connection between the calling communication device and the first telecommunication node;

transmitting from the first telecommunication node a request for service including at least one of cost and class of service;

identifying by a server node one of a plurality of links connecting the first telecommunication node and the second telecommunication node based on the at least one of cost and class of service requested by a user;

identifying at least one of the plurality of links to carry the call from the calling communication device to the called communication device by comparing the requested at least one of cost and class of service with data in a call database and a link database containing such data;

establishing a second connection between the second telecommunication node and the called communication device; and connecting the calling communication device to the called communication device via the first connection, the second connection, and the identified at least one of the plurality of links so as to carry telecommunication traffic therethrough.

7. The method of claim 6, wherein the calling communication device and the called communication device are telephones.

8. The method of claim 6, wherein the calling communication device and the called communication device are fax machines.

9. The method of claim 6, wherein an identified link is an ISDN link comprising a user-services channel with a bandwidth of at least 64 Kb/s.

10. The method of claim 6, wherein telecommunications traffic transmitted over an identified link is compressed prior to transmission.

11. The method of claim 10, wherein the compression ratio is at least 8:1.

12. A system for dynamically routing telecommunication traffic from a calling communication device to a called communication device, the system comprising:

a first telecommunication node in communication with the calling communication device, the first telecommunication node configured to transmit a request for service including at least one of cost and class of service;

a second telecommunication node in communication with the called communication device;

a plurality of links connecting the first telecommunication node and the second telecommunication node, each of the plurality of links associated with a cost and a class of service;

a call database containing data relating to the request for service comprising cost and class of service information;

a link database containing data indicating bandwidth availability of each of the plurality of links; and a server node in communication with the first telecommunication node and the second telecommunication node, the server node being configured to identify, through comparison of the data in the call and link databases, one of the plurality of links for routing the telecommunication traffic from the first telecommunication node.

13. The system of claim 12, wherein the link database comprises a bandwidth-utilization field which tracks the dynamic allocation of bandwidth of each link.

14. The system of claim 12, wherein the calling communication device and the called communication device are telephones.

15. The system of claim 12, wherein the calling communication device and the called communication device are fax machines.

16. The system of claim 12, wherein at least one of the first and second calls comprises a guaranteed connection.

17. The system of claim 12, wherein at least one of the first and second calls comprises a non-guaranteed connection.

18. A method of transmitting telecommunication traffic from a calling communication device to a called communication device via a call routing path comprising a first telecommunication node and a second telecommunication node, comprising:

storing data indicating bandwidth availability of each of the plurality of links in a link database;

receiving and storing in a call database a request from a first telecommunication node in communication with the calling communication device, the request including at least one of cost and class of service;

identifying, using the call and link databases, by a server node one of a plurality of telecommunication links connecting the first telecommunication node and the second telecommunication node along the call routing path based on at least one of cost and class of service associated with each of the plurality of telecommunication links; and utilizing an identified one of the plurality of telecommunication links to carry the telecommunication traffic from the calling communication device to the called communication device.

19. The method of claim 18, wherein the identified one of the plurality of telecommunication links between the first telecommunication node and the second telecommunication node is an ISDN link comprising a user-services channel with a bandwidth of at least 64 Kb/s.

20. The method of claim 18, wherein the calling communication device and the called communication device are telephones.

21. The method of claim 18, wherein the calling communication device and the called communication device are fax machines.

* * * * *